United States Patent
Iwami et al.

(10) Patent No.: US 10,248,084 B2
(45) Date of Patent: Apr. 2, 2019

(54) CONTROLLER, CONTROL METHOD, AND CONTROL PROGRAM

(71) Applicant: OMRON Corporation, Kyoto-shi, Kyoto (JP)

(72) Inventors: Taro Iwami, Osaka (JP); Yumi Tsutsumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 763 days.

(21) Appl. No.: 14/646,993

(22) PCT Filed: Nov. 11, 2013

(86) PCT No.: PCT/JP2013/080404
§ 371 (c)(1),
(2) Date: May 22, 2015

(87) PCT Pub. No.: WO2014/087805
PCT Pub. Date: Jun. 12, 2014

(65) Prior Publication Data
US 2015/0309482 A1 Oct. 29, 2015

(30) Foreign Application Priority Data
Dec. 7, 2012 (JP) ................................. 2012-268201

(51) Int. Cl.
*G05B 11/42* (2006.01)
*G05D 23/19* (2006.01)
*G05B 13/02* (2006.01)

(52) U.S. Cl.
CPC ............ *G05B 11/42* (2013.01); *G05B 13/024* (2013.01); *G05D 23/1919* (2013.01)

(58) Field of Classification Search
CPC .............................. G05B 11/42; G05B 13/024
See application file for complete search history.

(56) References Cited

U.S. PATENT DOCUMENTS 4,912,381 A * 3/1990 Culberson ........... H02P 23/0077
318/561
5,245,528 A * 9/1993 Saito .................. G05B 13/0275
318/561
(Continued)

FOREIGN PATENT DOCUMENTS

CN 1036278 A 10/1989
CN 102176176 A 9/2011
(Continued)

OTHER PUBLICATIONS

Liu, Tao, Yao, Ke, Gao, Furong, "Identification and Autotuning of Temperature-Control System With Application to Injection Molding", IEEE Transactions on Control Systems Technology, vol. 17, No. 6, May 19, 2009, pp. 1282-1294.*
(Continued)

*Primary Examiner* — Mark A Connolly
(74) *Attorney, Agent, or Firm* — Osha Liang LLP

(57) ABSTRACT

A controller having an auto-tuning function has a manipulated value determination unit that selectively determines a first manipulated value for causing a first change in a controlled value of a controlled object or a second manipulated value for causing a second change opposite to the first change in the controlled value, in accordance with a preset parameter, so that a process value obtained from the controlled object follows a target value, and a tuning unit that alternately outputs the first manipulated value and the second manipulated value in accordance with the process value, and that determines the parameter from a response characteristic obtained through the alternate output. The tuning unit successively changes a magnitude of the first manipulated value each time output is switched during the alternate output of the first manipulated value and the second manipulated value.

7 Claims, 19 Drawing Sheets

(56) References Cited

U.S. PATENT DOCUMENTS

| | | | | |
|---|---|---|---|---|
| 5,572,558 | A | * | 11/1996 | Beherns .......... G11B 20/10037 375/350 |
| 6,980,869 | B1 | * | 12/2005 | Chandhoke .......... G05B 13/024 318/561 |
| 2003/0216823 | A1 | | 11/2003 | Tanaka |
| 2004/0064240 | A1 | * | 4/2004 | Sugano .............. B60K 31/0008 701/93 |
| 2004/0148059 | A1 | * | 7/2004 | Tanaka ................ G05B 13/024 700/276 |
| 2004/0230325 | A1 | * | 11/2004 | Ramamoorthy ..... G05B 13/042 700/37 |
| 2006/0207272 | A1 | * | 9/2006 | Hirayama .......... G05D 23/1919 62/157 |

FOREIGN PATENT DOCUMENTS

| | | |
|---|---|---|
| CN | 102807390 A | 12/2012 |
| JP | H05-27802 A | 2/1993 |
| JP | H05-289704 A | 11/1993 |
| JP | H06-161509 A | 6/1994 |
| JP | H06-161569 A | 6/1994 |
| JP | 2802460 B2 | 9/1998 |
| JP | 3211444 B2 | 9/2001 |
| JP | 2004-227062 A | 8/2004 |
| JP | 2009-157691 A | 7/2009 |

OTHER PUBLICATIONS

Office Action in counterpart Chinese Patent Application No. 201380061335.8 dated Jul. 7, 2016 (30 pages).

International Search Report issued in PCT/JP2013/080404 dated Jan. 21, 2014 (2 pages).

Ziegler, J.G. et al.; "Optimum Settings for Automatic Controllers"; American Society of Mechanical Engineers, Nov. 1942, pp. 759-765 (7 pages).

Extendeded European Search Report in counterpart European Application No. 13 86 0031.7 dated Jun. 22, 2016 (7 Pages).

* cited by examiner

CONTROLLER, CONTROL METHOD, AND CONTROL PROGRAM

BACKGROUND

Technical Field

The present invention relates to a controller having an auto-tuning function, a control method in the controller, and a control program for implementing the controller.

Related Art

Feedback control systems including PID control systems are now used in a variety of applications such as temperature control, speed control, and position control. In such a feedback control system, in order to enhance responsiveness to a change of a target value and convergence for disturbance, it is important to optimize control parameters such as proportional gain, integral time, and derivative time in accordance with a controlled object.

It is, however, difficult for users having no knowledge on feedback control systems to optimize control parameters. Auto-tuning function for automatically optimizing such control parameters have therefore been developed and put into practice. As typical examples of such auto-tuning function, the step response method, the ultimate sensitivity method (see Non PTD 1), the limit cycle method (see PTDs 1 and 2), and other methods are known.

Specifically, Japanese Patent Laying-Open No. 05-289704 (PTD 1) discloses a heating/cooling controller having two kinds of, namely, heating and cooling, PID computation functions. This heating/cooling controller has heating and cooling auto-tuning functions. Japanese Patent Laying-Open No. 2004-227062 (PTD 2) discloses a heat/cool control technique in which temperature control is performed by appropriately switching between a heat mode for outputting a manipulated value to a heating actuator and a cool mode for outputting a manipulated value to a cooling actuator. This heat/cool control technique includes a limit cycle auto-tuning method in which a control parameter is adjusted by producing limit cycles having a constant manipulated value amplitude.

CITATION LIST

Patent Document

PTD 1: Japanese Patent Laying-Open No. 05-289704
PTD 2: Japanese Patent Laying-Open No. 2004-227062

Non Patent Document

NPD 1: J. G. Ziegler and N. B. Nichols, "Optimum Settings for Automatic Controllers", TRANSACTIONS OF THE A.S.M.E., November, 1942

SUMMARY

When a feedback control system includes a nonlinear element, that is, the nonlinearity between a manipulated value and a controlled value produced in a controlled object is strong, control parameters sometimes cannot be optimized with the auto-tuning function. The heating/cooling controller described in PTD 1 is configured such that individual levels of the manipulated values are limited using a limit ratio during cooling auto-tuning. However, there is no disclosure as to a value to be determined as the limit ratio, and the limit ratio has to be determined empirically or by try and error in accordance with a controlled object. The heat/cool control device described in PTD 2 is configured such that a first limit cycle and a second limit cycle are produced, and a control parameter is calculated based on the control response thereto. The configuration described in PTD 2, however, is premised on that there is a difference between the heating capacity on the heating side and the cooling capacity on the cool side and does not cope with a case where the heating capacity and/or the cooling capacity each have nonlinearity.

A controller according to one or more embodiments of the present invention is capable of properly performing auto-tuning even for a controlled object with strong nonlinearity, a control method in the controller, and a control program according to one or more embodiments of the present invention may implement the controller.

A controller according to one or more embodiments of the present invention has a user-friendly auto-tuning function, a control method in the controller, and a control program according to one or more embodiments of the present invention may implement the controller.

A controller having an auto-tuning function according to one or more embodiments of the present invention includes: a manipulated value determination unit for selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and a tuning unit for alternately outputting the first manipulated value and the second manipulated value in accordance with the process value and determining the parameter from a response characteristic obtained through the alternate output. The tuning unit successively changes a magnitude of the first manipulated value each time output is switched during the alternate output of the first manipulated value and the second manipulated value and determines the parameter from a response characteristic obtained when it is determined that the first change in the controlled value to the first manipulated value has linearity.

According to one or more embodiments of the present invention, the tuning unit determines a magnitude of the first manipulated value in the new alternate output from a response characteristic obtained through an immediately preceding alternate output.

According to one or more embodiments of the present invention, the tuning unit determines a magnitude of the first manipulated value in the new alternate output by correcting a magnitude of the first manipulated value in an immediately preceding alternate output in accordance with a length of a period in which the first manipulated value is output and a length of a period in which the second manipulated value is output in the immediately preceding alternate output.

According to one or more embodiments of the present invention, the tuning unit determines whether the first change in the controlled value to the first manipulated value has linearity by evaluating a relation of a change rate of the controlled value corresponding to the first manipulated value, for each magnitude of the first manipulated value successively changed.

According to one or more embodiments of the present invention, the tuning unit determines the parameter from a response characteristic obtained in a final alternate output if the alternate output of the first manipulated value and the second manipulated value is executed a predetermined number of times, even when it is not determined that the first change in the controlled value to the first manipulated value has linearity.

A controller having an auto-tuning function according to one or more embodiments of the present invention includes: a manipulated value determination unit for selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and a tuning unit for alternately outputting the first manipulated value and the second manipulated value in accordance with the process value and determining the parameter from a response characteristic obtained through the alternate output. The tuning unit determines a magnitude of the first manipulated value in a new alternate output by correcting a magnitude of the first manipulated value in an immediately preceding alternate output in accordance with an n-th power (n>1) of a ratio of a length of a period in which the first manipulated value is output to a length of a period in which the second manipulated value is output in the immediately preceding alternate output.

According to one or more embodiments of the present invention, the tuning unit determines a magnitude of the first manipulated value in a new alternate output, using n that satisfies $1.5 \leq n \leq 3.0$.

According to one or more embodiments of the present invention, the controlled object includes an extruder including a heating device and a cooling device, a controlled value for heating generated in the controlled object by the heating device has relatively strong linearity with respect to a corresponding manipulated value, and a controlled value for cooling generated in the controlled object by the cooling device has relatively strong nonlinearity with respect to a corresponding manipulated value.

A controller having an auto-tuning function according to one or more embodiments of the present invention includes: a manipulated value determination unit for selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and a tuning unit for alternately outputting the first manipulated value and the second manipulated value once for each in accordance with the process value and determining the parameter from a response characteristic obtained through the alternate output of the first manipulated value and the second manipulated value once for each. The tuning unit estimates a range of the first manipulated value in which the first change in the controlled value to the first manipulated value can keep linearity from the response characteristic and determines the parameter from the estimated range.

A controller having an auto-tuning function according to one or more embodiments of the present invention includes: a manipulated value determination unit for selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; a tuning unit for alternately outputting the first manipulated value and the second manipulated value in accordance with the process value and determining the parameter from a response characteristic obtained through the alternate output; and a display unit for displaying a count of the alternate output executed at present.

A controller having an auto-tuning function according to one or more embodiments of the present invention includes: a manipulated value determination unit for selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; a tuning unit for alternately outputting the first manipulated value and the second manipulated value in accordance with the process value and determining the parameter from a response characteristic obtained through the alternate output; and a display unit for displaying a timing when alternate output necessary for determination of the parameter is completed.

A control method in a controller having an auto-tuning function according to one or more embodiments of the present invention includes the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and alternately outputting the first manipulated value and the second manipulated value in accordance with the process value and determining the parameter from a response characteristic obtained through the alternate output. The step of determining the parameter includes the step of successively changing a magnitude of the first manipulated value each time output is switched during the alternate output of the first manipulated value and the second manipulated value, and determining the parameter from a response characteristic obtained when it is determined that the first change in the controlled value to the first manipulated value has linearity.

A control method in a controller having an auto-tuning function according to one or more embodiments of the present invention includes the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and alternately outputting the first manipulated value and the second manipulated value in accordance with the process value and determining the parameter from a response characteristic obtained through the alternate output. The step of determining the parameter includes the step of determining a magnitude of the first manipulated value in a new alternate output by correcting a magnitude of the first manipulated value in an immediately preceding alternate output in accordance with an n-th power (n>1) of a ratio of a length of a period in which the first manipulated value is output to a length of a period in which the second manipulated value is output in the immediately preceding alternate output.

A control method in a controller having an auto-tuning function according to one or more embodiments of the present invention includes the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and alternately outputting the first manipulated value and the second manipulated value once for each in accordance with the process value and determining the parameter from a response characteristic obtained through the alternate output of the first manipulated value and the second manipulated value once for each. The step of determining the parameter includes the step of estimating a range of the first manipulated value in which the first change in the controlled value to the first manipulated value can keep linearity from the response characteristic and determining the parameter from the estimated range.

A control method in a controller having an auto-tuning function according to one or more embodiments of the present invention includes the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; alternately outputting the first manipulated value and the second manipulated value in accordance with the process value and determining the parameter from a response characteristic obtained through the alternate output; and displaying a count of the alternate output executed at present.

A control method in a controller having an auto-tuning function according to one or more embodiments of the present invention includes the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; alternately outputting the first manipulated value and the second manipulated value in accordance with the process value and determining the parameter from a response characteristic obtained through the alternate output; and displaying a timing when alternate output necessary for determination of the parameter is completed.

A control program for implementing a controller having an auto-tuning function according to one or more embodiments of the present invention causes a processor to execute the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and alternately outputting the first manipulated value and the second manipulated value in accordance with the process value and determining the parameter from a response characteristic obtained through the alternate output. The step of determining the parameter includes the step of successively changing a magnitude of the first manipulated value each time output is switched during the alternate output of the first manipulated value and the second manipulated value and determining the parameter from a response characteristic obtained when it is determined that the first change in the controlled value to the first manipulated value has linearity.

A control program for implementing a controller having an auto-tuning function according to one or more embodiments of the present invention causes a processor to execute the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and alternately outputting the first manipulated value and the second manipulated value in accordance with the process value and determining the parameter from a response characteristic obtained through the alternate output. The step of determining the parameter includes the step of determining a magnitude of the first manipulated value in a new alternate output by correcting a magnitude of the first manipulated value in an immediately preceding alternate output in accordance with an n-th power (n>1) of a ratio of a length of a period in which the first manipulated value is output to a length of a period in which the second manipulated value is output in the immediately preceding alternate output.

A control program for implementing a controller having an auto-tuning function according to one or more embodiments of the present invention causes a processor to execute the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; and alternately outputting the first manipulated value and the second manipulated value once for each in accordance with the process value and determining the parameter from a response characteristic obtained through the alternate output of the first manipulated value and the second manipulated value once for each. The step of determining the parameter includes the step of estimating a range of the first manipulated value in which the first change in the controlled value to the first manipulated value can keep linearity from the response characteristic and determining the parameter from the estimated range.

A control program for implementing a controller having an auto-tuning function according to one or more embodiments of the present invention causes a processor to execute the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; alternately outputting the first manipulated value and the second manipulated value in accordance with the process value and determining the parameter from a response characteristic obtained through the alternate output; and displaying a count of the alternate output executed at present.

A control program for implementing a controller having an auto-tuning function according to one or more embodiments of the present invention causes a processor to execute the steps of: selectively determining a first manipulated value for causing a first change in a controlled value of a controlled object or a second manipulated value for causing a second change opposite to the first change in the controlled value, in accordance with a preset parameter, such that a process value obtained from the controlled object follows a target value; alternately outputting the first manipulated value and the second manipulated value in accordance with the process value and determining the parameter from a response characteristic obtained through the alternate output; and displaying a timing when alternate output necessary for determination of the parameter is completed.

According to one or more embodiments of the present invention, the control parameter can be properly determined by auto-tuning even for a controlled object with strong nonlinearity. According to one or more embodiments of the present invention, a user-friendly auto-tuning function can be provided.

DETAILED DESCRIPTION

Embodiments of the present invention will be described in details with reference to the figures. It is noted that the same or corresponding parts in the figures are denoted with the same reference signs and a description thereof is not repeated. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A. Controlled Process

Figure 1:
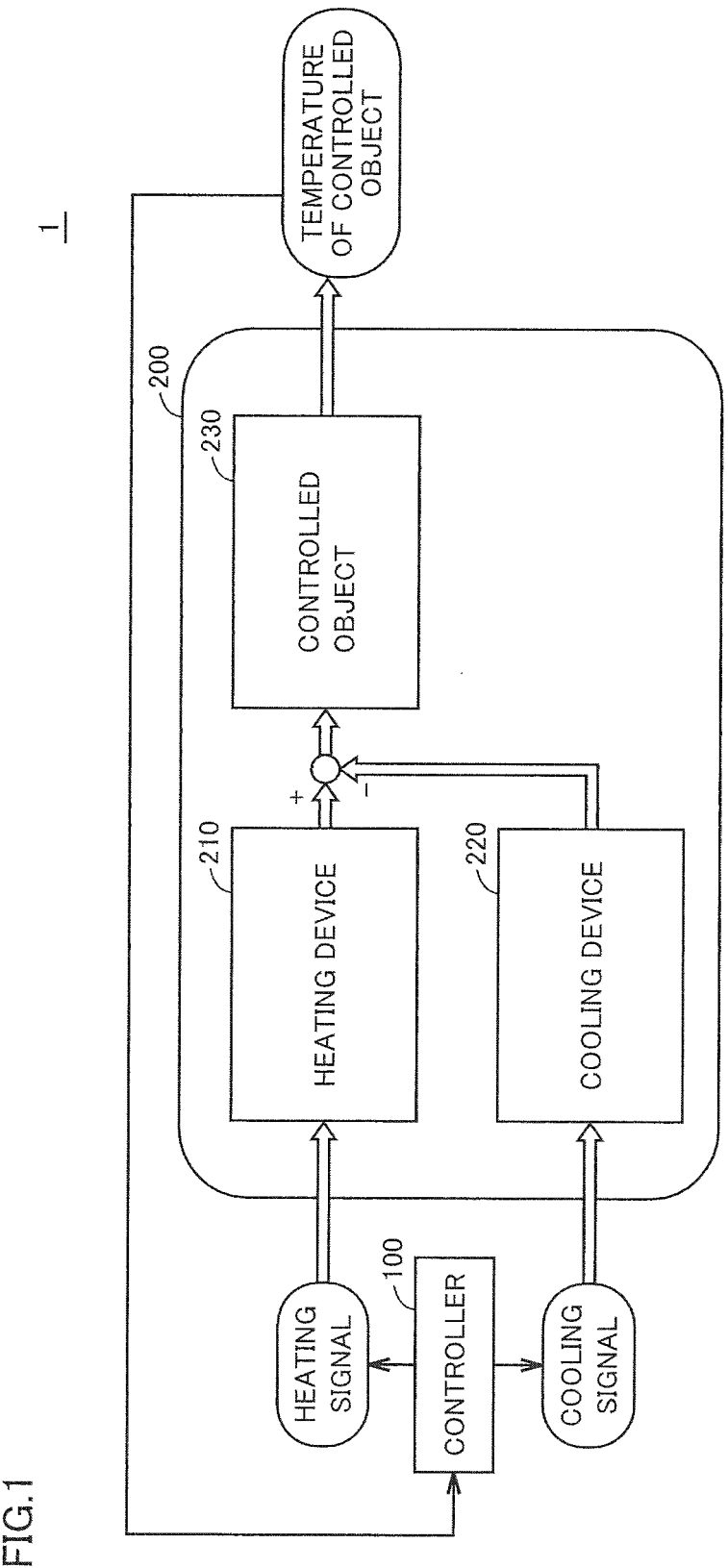
FIG. 1 is a schematic diagram showing a feedback control system according to one or more embodiments of the present invention.

An object controlled by a controller according to one or more embodiments of the present invention will be described. FIG. 1 is a schematic diagram showing a feedback control system 1 according to one or more embodiments of the present invention. Referring to FIG. 1, feedback control system 1 includes a controller 100 and a controlled process 200. Controlled process 200 includes a heating device 210 and a cooling device 220 as actuators, and these devices perform heating or cooling for a controlled object 230.

Controller 100 selectively determines a first manipulated value (a manipulated value on the cooling side) for causing a first change (cooling) in the controlled value of controlled object 230 or a second manipulated value (a manipulated value on the heating side) for causing a second change (heating) opposite to the first change in the controlled value, in accordance with a preset parameter, so that the process value (temperature) obtained from controlled object 230 follows a target value. That is, basically, heating and cooling are not simultaneously done, and heating for controlled object 230 by heating device 210 and cooling for controlled object 230 by cooling device 220 are selectively executed so that the temperature of controlled object 230 follows a preset target value.

In order to implement such control, controller 100 compares the fed-back temperature of controlled object 230 with a preset target value and selectively outputs a heating signal or a cooling signal to heating device 210 or cooling device 220, respectively. That is, controller 100 controls heating device 210 and cooling device 220 to keep the temperature of controlled object 230 constant.

In the following description, of the values belonging to controlled object 230, the one that represents a control object is referred to as a "controlled value" and the amount obtained by a detection unit such as a temperature sensor provided for controlled object 230 is referred to as a "process value". Strictly speaking, the "process value" is defined as a value including some error in the "controlled value". However, if this error is ignored, the "process value" can be considered as the "controlled value" of controlled object 230. In the following description, therefore, the "process value" and the "controlled value" may be synonymously used.

Although controlled process 200 shown in FIG. 1 includes any process, typical examples include temperature control for raw materials in extruders and temperature control in thermostatic baths. Details of one or more embodiments of the present invention will be described below by taking temperature control for a raw material in an extruder as an example. However, the applicable range of the present invention is not limited to this process.

Feedback control system 1 including controller 100 according to one or more embodiments of the present invention includes a PID control system. In the present description, the "PID control system" means a control system including at least one of a proportional element performing proportional operation (P operation), an integral element performing integral operation (I operation), and a derivative element performing derivative operation (D operation). That is, in the present description, the PID control system is a concept that encompasses a control system including all of a proportional element, an integral element, and a derivative element as well as a control system (PI control system) including some of control elements, for example, only a proportional element and an integral element.

Controller 100 according to one or more embodiments of the present invention has an auto-tuning function for optimizing a control parameter (hereinafter also denoted as "PID parameter") necessary for the PID control system. As this auto-tuning function, controller 100 alternately outputs a first manipulated value (a manipulated value on the cooling side) and a second manipulated value (a manipulated value on the heating side) in accordance with the process value and determines a PID parameter from the response characteristic obtained from the alternate output. That is, controller 100 alternately outputs the manipulated value on the cooling side and the manipulated value on the heating side to produce a limit cycle and determines a PID parameter based on the response characteristic of the produced limit cycle. The details of the auto-tuning function will be described later.

B. System Configuration

Figure 2:
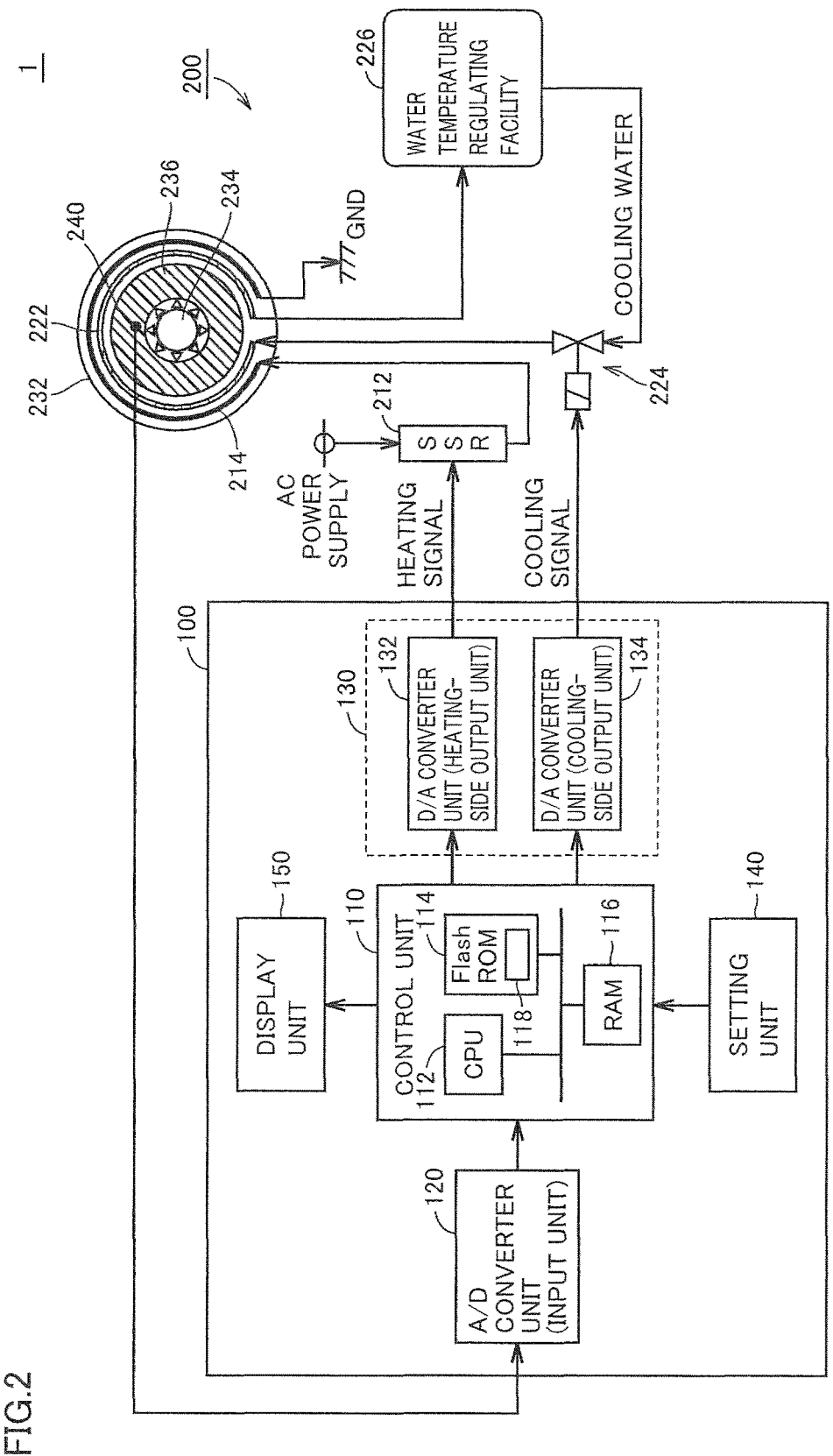
FIG. 2 is a schematic diagram showing a system configuration for implementing the feedback control system according to one or more embodiments of the present invention.

An implementation example of feedback control system 1 shown in FIG. 1 applied to a process in an extruder will now be described. FIG. 2 is a schematic diagram showing a system configuration for implementing feedback control system 1 according to one or more embodiments of the present invention.

Referring to FIG. 2, controller 100 outputs a manipulated value (hereinafter also referred to as "MV") so that the temperature (process value; hereinafter also referred to as "PV") measured from controlled process 200 follows the input target value (setting point; hereinafter also referred to as "SP"). Controller 100 outputs a heating signal for heating and a cooling signal for cooling, as the manipulated value.

Specifically, controller 100 includes a control unit 110, an input unit 120 including an analog/digital (A/D) converter unit, an output unit 130 including two digital/analog (D/A) converter units, a setting unit 140, and a display unit 150.

Control unit 110 is an operational entity for implementing a general PID control function, an auto-tuning function, and other functions and includes a CPU (Central Processing Unit) 112, a flash ROM (Read Only Memory) 114 storing a program module 118 in a nonvolatile manner, and a RAM (Random Access Memory) 116. CPU 112 is a processor and executes program module 118 stored in flash ROM 114 to implement processing described later. In doing so, data (for example, PV and SP) necessary for executing the read program module 118 is temporarily stored into RAM 116. CPU 112 may be replaced by a DSP (Digital Signal Processor) intended for digital signal processing. Program module 118 may be configured to be updatable through a variety of recording media. Program module 118 per se may be included in the technical range of the present invention. Control unit 110 as a whole may be implemented using an FPGA (Field-Programmable Gate Array), an ASIC (Application Specific Integrated Circuit), or the like.

Input unit 120 receives a measurement signal from a temperature sensor described later and outputs a signal indicating the value to control unit 110. For example, when the temperature sensor is a thermocouple, input unit 120 includes a circuit for detecting thermoelectromotive force generated at its opposite ends. Alternatively, when the temperature sensor is a resistor bulb, input unit 120 includes a circuit for detecting a resistance generated in the resistor bulb. Input unit 120 may further include a filter circuit for removing high frequency components.

Output unit 130 selectively outputs a heating signal or a cooling signal in accordance with the manipulated value calculated by control unit 110. Specifically, a heating-side output unit 132 including a digital/analog converter unit converts a digital signal indicating the manipulated value calculated by control unit 110 into an analog signal and outputs the analog signal as a heating signal. On the other hand, a cooling-side output unit 134 including a digital/analog converter unit converts a digital signal indicating the manipulated value calculated by control unit 110 into an analog signal and outputs the analog signal as a cooling signal.

Setting unit 140 includes a button, a switch, and the like for accepting a user's operation and outputs information indicating the accepted user operation to control unit 110. Typically, setting unit 140 accepts the setting of a target value (SP) and a command to start auto-tuning from the user.

Display unit 150 includes a display and an indicator and notifies the user of a state of processing in control unit 110.

Controlled process 200 includes an extruder 232 as an example of controlled object 230 (FIG. 1). Extruder 232 extrudes a raw material (for example, plastic) inserted in the inside through rotation of a screw 234 provided around the shaft in a barrel 236 that is a tube section. A temperature sensor 240 for detecting a temperature of the raw material is provided in the inside of extruder 232. Temperature sensor 240 includes a thermocouple or a resistor bulb (platinum resistance thermometer) by way of example.

In extruder 232, heat is absorbed due to reinsertion of the raw material while heat is generated due to movement of the raw material by rotation of screw 234. Therefore, heating device 210 and cooling device 220 (both shown in FIG. 1) are provided in order to suppress temperature variations due to the endothermic reaction and the exothermic reaction.

In feedback control system 1 shown in FIG. 2, a configuration in which a heating element is provided in the inside of extruder 232 is employed as an example of heating device 210.

More specifically, heating device 210 includes a solid state relay (SSR) 212 and an electric heater 214 as a resistor. Solid state relay 212 controls electrical connection/disconnection between an AC power supply and electric heater 214. More specifically, controller 100 outputs a PWM signal having a duty ratio in accordance with the manipulated value as a heating signal. Solid state relay 212 turns on/off the circuit in accordance with the PWM signal from controller 100. Electric power in accordance with the ratio of on/off of the circuit is supplied to electric heater 214. Electric power supplied to electric heater 214 becomes heat to be applied to the raw material.

On the other hand, cooling device 220 includes a cooling tube 222 arranged around the periphery of extruder 232, a solenoid valve 224 controlling the flow rate of a coolant (typically, water or oil) supplied to cooling tube 222, and a water temperature regulating facility 226 for cooling the coolant after passage through cooling tube 222. Solenoid valve 224 regulates the flow rate of the coolant flowing through cooling tube 222 to control the cooling capacity. More specifically, controller 100 outputs a signal having a voltage value or a current value having a magnitude corresponding to the manipulated value as a cooling signal to solenoid valve 224. Solenoid valve 224 regulates the degree of opening of the valve in accordance with the cooling signal from controller 100. This opening degree regulation controls the amount of heat removed from extruder 232. When a solenoid valve capable of only two-position operation (open or closed) is employed, a PWM signal having a duty ratio in accordance with the manipulated value is output as a cooling signal in the same manner as with the heating signal, and the open time and the closed time of solenoid valve 224 are regulated to control the flow rate of the coolant.

C. Problem

The problem in control that is derived from the nonlinearity between the manipulated value and the controlled value produced in a controlled object and may occur in feedback control system 1 shown in FIG. 2 will now be described. In particular, the problem that occurs when auto-tuning is executed will be described.

Figure 3:
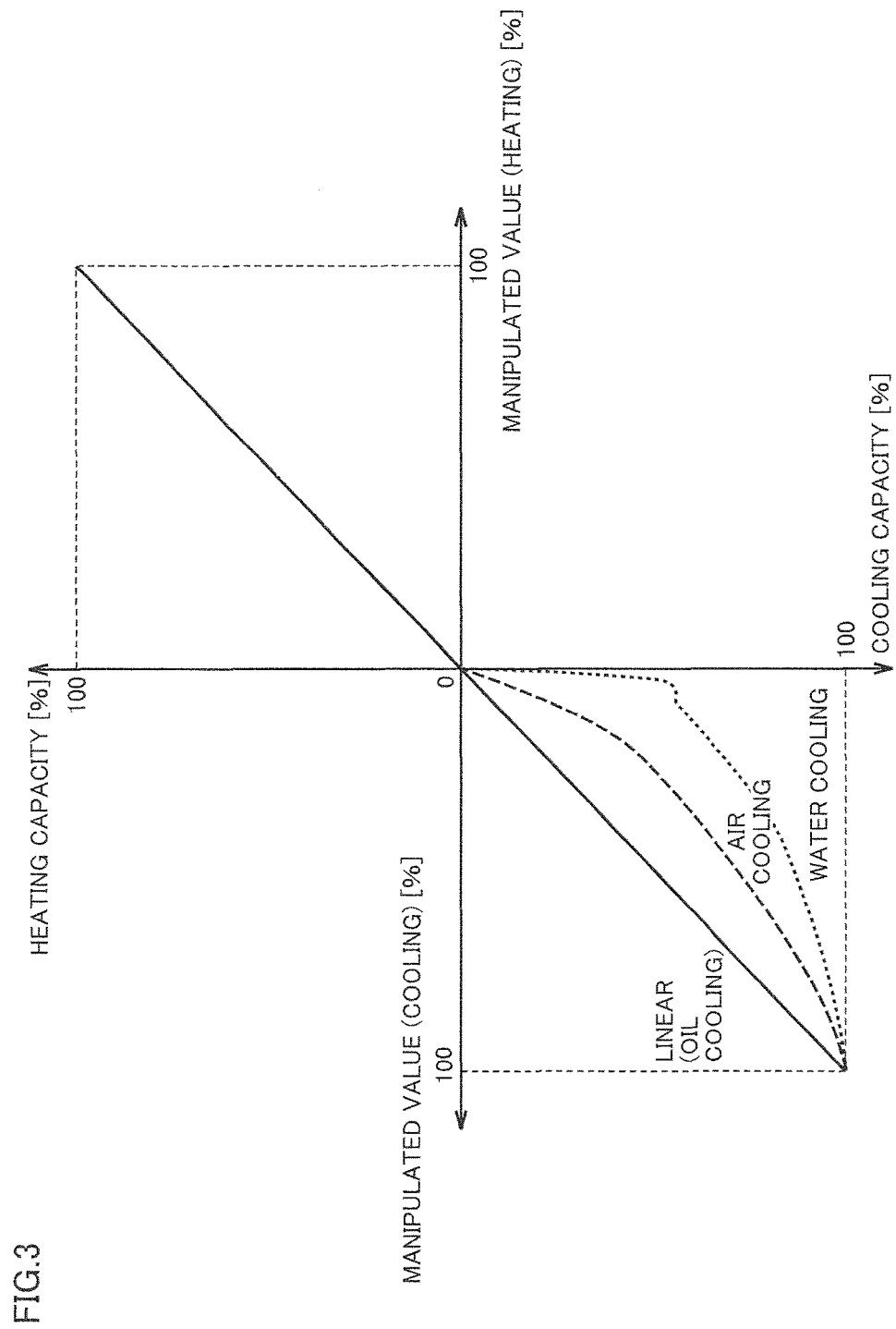
FIG. 3 is a diagram illustrating a characteristic example between the manipulated value and the heating capacity and the cooling capacity in a controlled process shown in FIG. 2.

FIG. 3 is a diagram illustrating a characteristic example between the manipulated value and the heating capacity and the cooling capacity in controlled process 200 shown in FIG. 2. In the present description, "heating capacity" and "cooling capacity" are defined as follows when represented by percentages.

Heating capacity [%]=heating temperature with a
   given manipulated value [° C./sec]/maximum
   heating temperature [° C./sec]×100 [%]

Cooling capacity [%]=cooling temperature with a
   given manipulated value [° C./sec]/maximum
   cooling temperature [° C./sec]×100 [%]

First, the heating characteristic (the relation of the heating capacity to the manipulated value of heating) is generally linear as shown in FIG. 3. That is, linearity holds. This is because electric heater 214 is used as heating device 210 and the heating amount can be controlled by supplying current (power) proportional to the manipulated value.

By contrast, the cooling characteristic has different characteristics in accordance with the coolant flowing through cooling tube 222 included in cooling device 220. For example, when oil is used as a coolant, it is stable without a phase change and the cooling capacity is generally linear relative to the manipulated value of cooling. That is, linearity holds. By contrast, when water is used as a coolant or when air is used (air cooling), the cooling capacity is nonlinear relative to the manipulated value of cooling. The cooling characteristics widely vary depending on the coolant and the cooling method.

In particular, in the water cooling method using water, heat of vaporization during change from the liquid phase to the gas phase is relatively large, and the cooling capacity is extremely large in a region where such heat of vaporization is produced. In the cooling method using water (water cooling), therefore, the heat of vaporization has a large effect to enhance the nonlinearity. For such a water cooling method, it is not easy to previously grasp the characteristic of the capacity.

Figure 4:
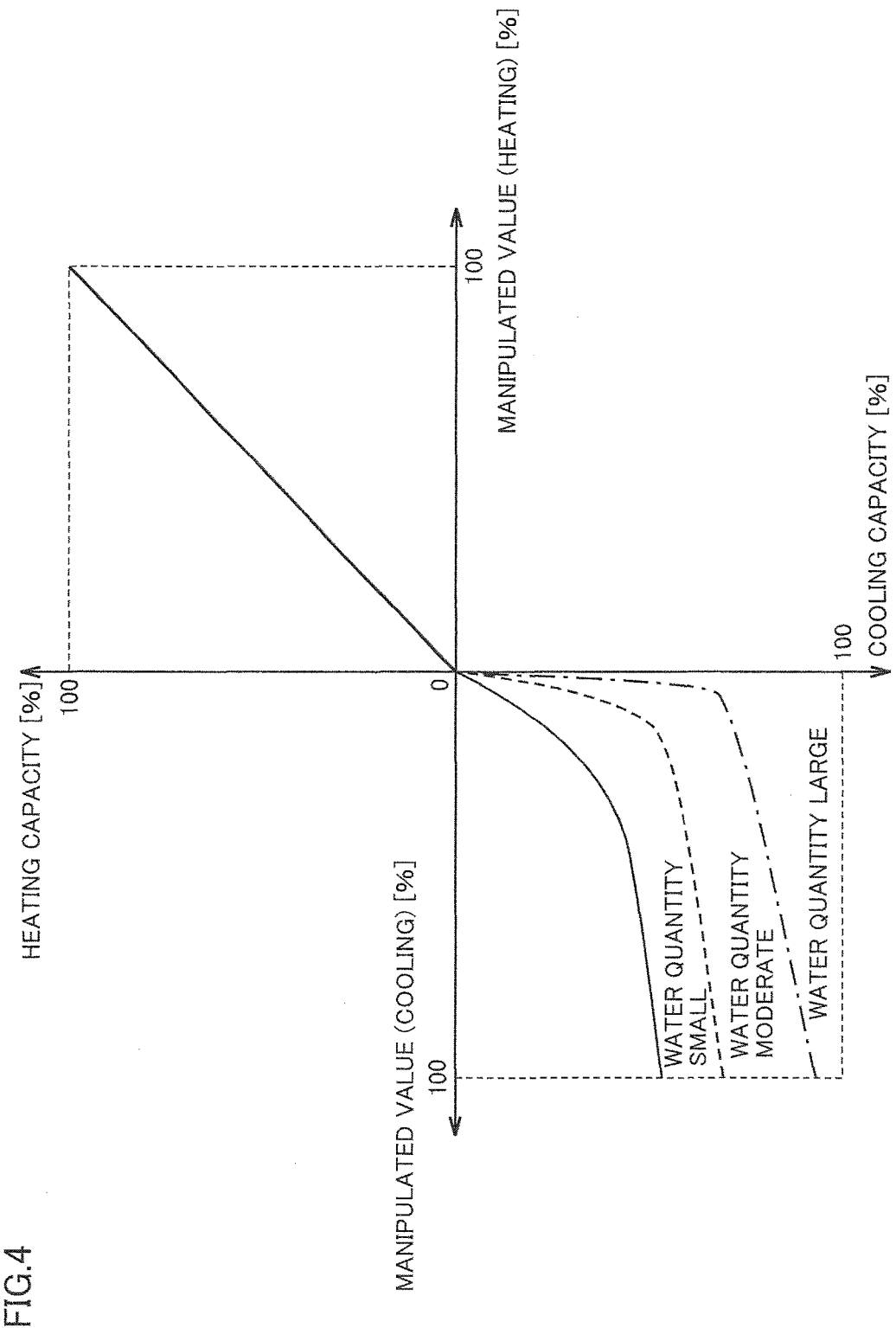
FIG. 4 is a diagram showing another characteristic example between the manipulated value and the heating capacity and the cooling capacity in the controlled process shown in FIG. 2.

FIG. 4 is a diagram showing another characteristic example between the manipulated value and the heating capacity and the cooling capacity in the controlled process shown in FIG. 2. The characteristic example shown in FIG. 4 represents the characteristic of the cooling capacity with different quantities of water for fulfilling the cooling capacity when the water cooling method shown in FIG. 3 is employed. As shown in FIG. 4, it is understood that the manipulated value that produces nonlinearity changes with different quantities of water.

When general auto-tuning is executed for such a feedback control system having strong nonlinearity to determine a PID parameter, the control performance may be deteriorated. The reason why the control performance is thus deteriorated is described below.

Figure 5:
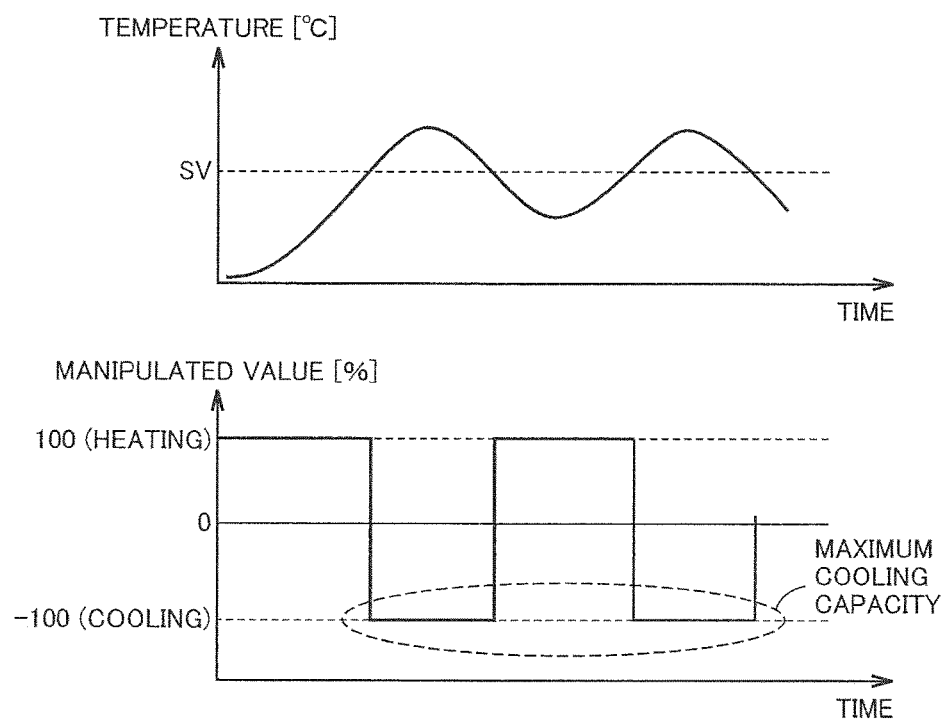
FIG. 5 is a diagram showing an example of the temperature (process value) of a controlled object and the manipulated value changing over time during execution of general auto-tuning.
Figure 6:
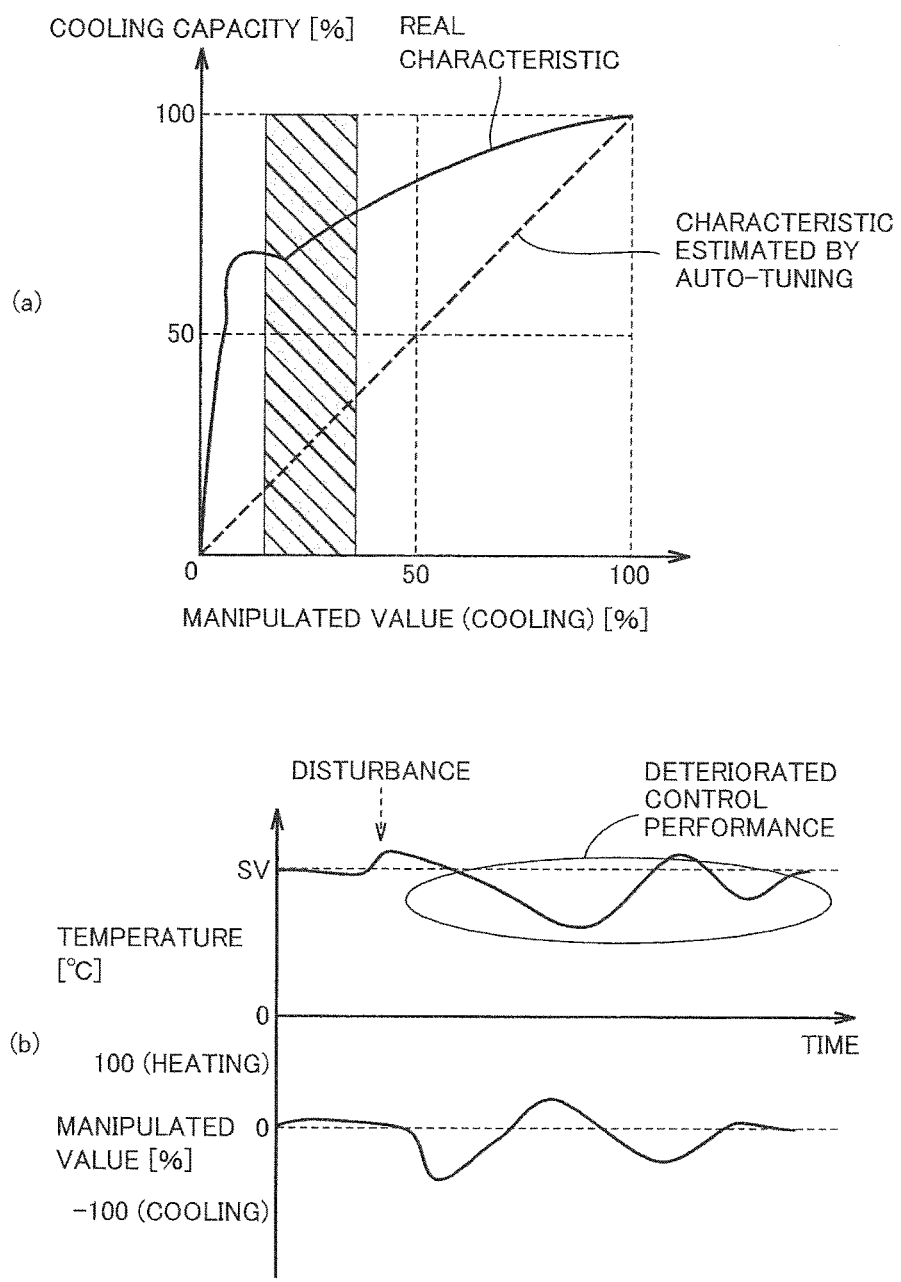
FIGS. 6(a)-(b) are diagrams showing an example of the temperature (process value) of a controlled object and the manipulated value changing over time when feedback control is performed using the PID parameter determined by execution of auto-tuning shown in FIG. 5.

FIG. 5 is a diagram showing an example of the temperature (process value) of a controlled object and the manipulated value changing over time during execution of general auto-tuning. FIGS. 6(a)-6(b) are diagrams showing an example of the temperature (process value) of a controlled object and the manipulated value changing over time when feedback control is performed using the PID parameter determined by execution of auto-tuning shown in FIG. 5. More specifically, FIG. 6(a) shows the relation between the manipulated value on the cooling side and the cooling capacity, and FIG. 6(b) shows an example of the temperature (process value) and the manipulated value changing over time during feedback control.

FIG. 5 shows an example of the auto-tuning function using the limit cycle method. As shown in FIG. 5, when a general limit cycle method is applied, both of the manipulated value on the heating side and the manipulated value on the cooling side are set to the maximum values (that is, 100% and −100%), and these manipulated values are alternately provided to the controlled object. A PID parameter for the controlled object is determined based on the thus produced response characteristic.

When feedback control is performed using the thus determined PID parameter, if the manipulated value actually used is different from the one during auto-tuning, the control performance is deteriorated under the effect of nonlinearity. That is, since the manipulated value to maximize the cooling capacity is output during execution of auto-tuning as shown in FIG. 5, the characteristic of the cooling capacity is estimated on the premise of the maximum value of the cooling capacity of cooling device 220. That is, the characteristic as shown by the dotted line in FIG. 6(a) is estimated by the auto-tuning function. A PID parameter is determined in accordance with the estimated characteristic.

However, there is a region where the actual characteristic differs from the estimated characteristic, and as shown in FIG. 6(b), when feedback control is performed in a region where the manipulated value is relatively small, the actual characteristic widely differs from the estimated characteristic. Then if controlled object 230 is controlled using a relatively small manipulated value, the actual cooling capacity is higher than the estimation on which the PID parameter set by the auto-tuning function is premised, thereby cooling controlled object 230 too much.

Specifically, when controlled object 230 is cooled in a region where the manipulated value on the cooling side is relatively small (for example 10 to 30%), as shown in FIG. 6(b), if cooling is started in response to some disturbance, the temperature becomes much lower than the target value, and oscillatory temperature variations occur, the convergence of which takes time. As described above, the difference between the cooling capacity estimated by the auto-tuning function and the actual cooling capacity deteriorates the control performance.

D. Overview of Solution

An auto-tuning function that can set a more appropriate PID parameter for the feedback control system including controlled object 230 having strong nonlinearity as described above will be described.

In one or more embodiments of the present invention, the most preferable magnitude of the manipulated value is searched for while changing the manipulated value used in auto-tuning step-by-step. A PID parameter is then determined based on the response characteristic at the most preferable manipulated value.

More specifically, as the auto-tuning function, controller 100 successively changes the magnitude of the first manipulated value (the manipulated value on the cooling side) each time output is switched during the alternate output of the first manipulated value (the manipulated value on the cooling side) and the second manipulated value (the manipulated value on the heating side) and determines a PID parameter from the response characteristic obtained when it is determined that a first change in controlled value to the first manipulated value (the manipulated value on the cooling side) has linearity. That is, controller 100 executes a limit cycle multiple times while changing the manipulated value on the cooling side step-by-step. Then if it is determined that the result of each limit cycle satisfies a predetermined condition, controller 100 calculates a PID parameter on the cooling side from the cooling characteristic (response characteristic) at that time. A PID parameter on the heating side is also calculated from the heating characteristic (response characteristic).

Figure 7:
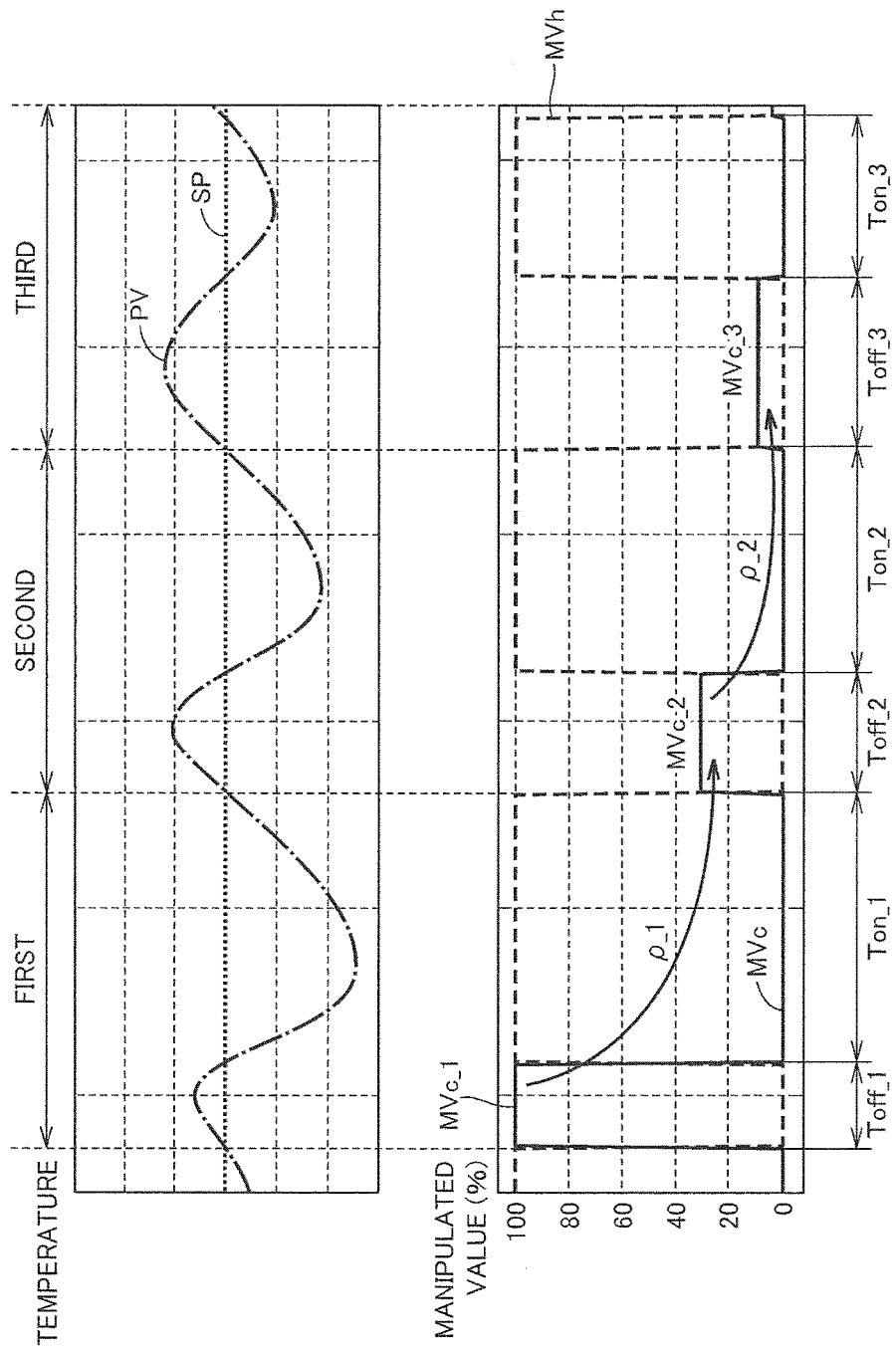
FIG. 7 is a diagram showing a temporal waveform example during execution of auto-tuning by a controller according to one or more embodiments of the present invention.
Figure 8:
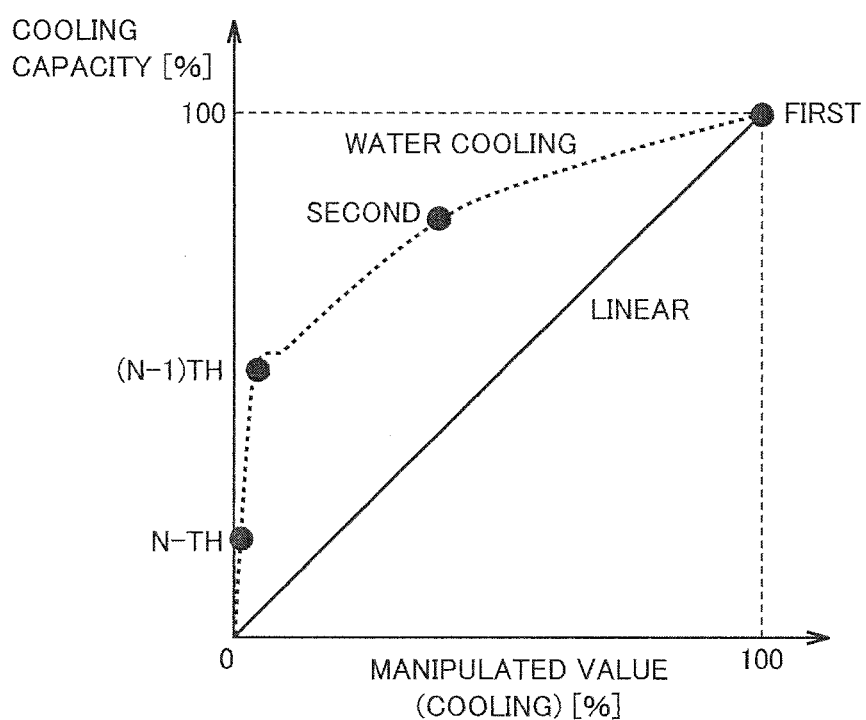
FIG. 8 is a diagram showing the changing manipulated value on the characteristic of the cooling capacity during execution of auto-tuning by the controller according to one or more embodiments of the present invention.

FIG. 7 is a diagram showing a temporal waveform example during execution of auto-tuning by controller 100 according to one or more embodiments of the present invention. FIG. 8 is a diagram showing the changing manipulated value on the characteristic of the cooling capacity during execution of auto-tuning by controller 100 according to one or more embodiments of the present invention.

In one or more embodiments of the present invention, since the cooling capacity has nonlinearity, controller 100 successively changes the magnitude of the manipulated value on the cooling side in each cycle of auto-tuning, as shown in FIG. 7. In a control system in which the heating capacity has nonlinearity, the magnitude of the manipulated value on the heating side is also successively changed.

More specifically, the manipulated value $MVc\_1$ on the cooling side in the first limit cycle is set to 100%, the manipulated value $MVc\_2$ on the cooling side in the second limit cycle is set to a value obtained by multiplying the first manipulated value $MVc\_1$ by $\rho\_1$, and the manipulated value $MVc\_3$ on the cooling side in the third limit cycle is set to a value obtained by multiplying the second manipulated value $MVc\_2$ by $\rho\_2$. The manipulated value MVc on the cooling side is subsequently changed for each limit cycle in the same manner. By successively changing the manipulated value MVc on the cooling side in this manner, the magnitude of the cooling capacity that is taken into consideration in auto-tuning successively changes as shown in FIG. 8.

Here, as for the change coefficient $\rho\_i$ ($0<\rho\_i<1$) for the manipulated value MVc on the cooling side, a predetermined constant value may be employed. However, according to one or more embodiments of the present invention, the magnitude of the manipulated value MVc on the cooling side in a new alternate output is determined from the response characteristic obtained with the immediately preceding alternate output. As an example of using the response characteristic in the immediately preceding alternate output in this manner, in one or more embodiments of the present invention, the following ratio representing the system gain ratio (capacity ratio) between heating and cooling.

Change coefficient $\rho\_i$=cooling output time $Toff\_i-1$/heating output time $Ton\_i-1$ The cooling output time $Toff\_i-1$ is the length of time during which the manipulated value MVc on the cooling side is kept zero in the (i−1)th (previous) limit cycle, and the heating output time $Ton\_i-1$ is the length of time during which the manipulated value MVc on the cooling side is output in the (i−1)th (previous) limit cycle (see FIG. 7).

Here, according to one or more embodiments of the present invention, the calculated change coefficient $\rho\_i$ is equal to or smaller than the change coefficient upper limit value $\rho\_max$ because the change coefficient $\rho\_i$ may exceed one in the expression above depending on the relation in magnitude between the cooling output time $Toff\_i-1$ and the heating output time $Ton\_i-1$.

As described above, as the auto-tuning function, controller 100 determines the magnitude of the first manipulated value in a new alternate output by correcting the magnitude of the first manipulated value in the immediately preceding alternate output in accordance with the length of the period (cooling output time Toff) in which the first manipulated value (the manipulated value on the cooling side) is output and the length of the period (heating output time Ton) in which the second manipulated value (the manipulated value on the heating side) is output in the immediately preceding alternate output.

The condition under which the search of successively changing the manipulated value MVc on the cooling side as described above is terminated may be that it is determined that the manipulated value is in a region having linearity in the cooling characteristic (the relation of the cooling capacity to the manipulated value for cooling). Here, as the auto-tuning function, controller 100 determines whether the first change in the controlled value to the first manipulated value has linearity by evaluating the relation of the change rate of the controlled value corresponding to the first manipulated value, according to the magnitude of the first manipulated value (the manipulated value on the cooling side) successively changed.

More specifically, the linearity in the cooling characteristic can be evaluated using an error as described below. That is, the condition for terminating the limit cycle includes that the calculated error is equal to or smaller than a preset threshold.

A PID parameter is then calculated using, for example, the Ziegle-Nichols' ultimate sensitivity method, based on the cooling characteristic and the heating characteristic (response characteristics) observed in the final limit cycle. Any known method can be employed as a method of calculating a PID parameter.

The limit cycle may be terminated if the number of produced limit cycles reaches an upper limit value (N times), because it is assumed that the calculated error may not be equal to or smaller than a preset threshold depending on the property of the control system. That is, as the auto-tuning function, controller 100 determines a PID parameter from the response characteristic obtained in the final alternate output if the alternate output of the first manipulated value and the second manipulated value is executed a predetermined number of times, even when it is not determined that the first change in the controlled value for the first manipulated value (the manipulated value on the cooling side) has linearity.

With such an auto-tuning method, an appropriate PID parameter can be calculated whether the controlled object has linearity or nonlinearity. For example, in the control system shown in FIG. 1, it is not necessary to change the procedure of auto-tuning and the like in accordance with the kind of coolant (water or oil).

E. Error Evaluation

Figure 9:
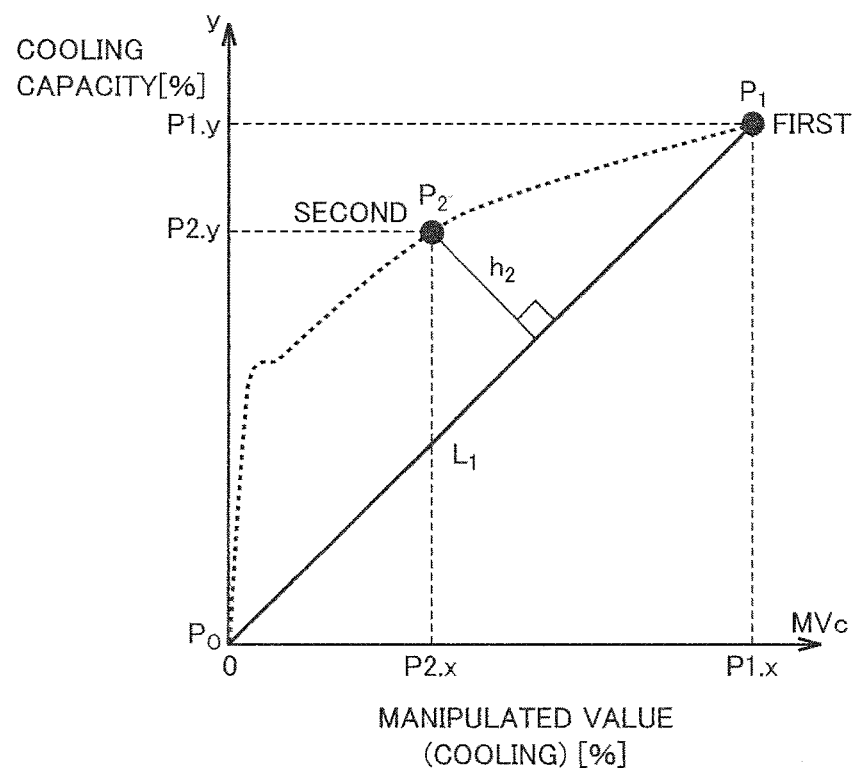
FIG. 9 is a diagram illustrating an error evaluation method in auto-tuning by the controller according to one or more embodiments of the present invention.

An error for determining whether the manipulated value is in a region having linearity will now be described. FIG. 9 is a diagram illustrating an error evaluation method in auto-tuning by controller 100 according to one or more embodiments of the present invention. As shown in FIG. 9, the "error" in one or more embodiments of the present invention is equivalent to a value indicating the degree of how far the cooling capacity corresponding to the manipulated value used in the present limit cycle is different from the straight line defined by the cooling capacity corresponding to the manipulated value used in the previous limit cycle, in the cooling characteristic (the relation of the cooling capacity to the manipulated value for cooling).

Specifically, as shown in FIG. 9, the cooling capacity point in the i-th limit cycle is defined as Pi (Pi.x, Pi.y) where the origin is P0. Here, Pi.x represents the cooling-side manipulated value and Pi.y represents the cooling capacity. The cooling capacity Pi.y is calculated from the ratio of the slope Ri during temperature decrease in the i-th limit cycle to the slope (change rate) R1 during temperature decrease in the first limit cycle (that is, Pi.y=Ri/R1). The straight line Li connecting the cooling capacity Pi and the origin P0 is set in each i-th limit cycle. An error hi is calculated as a distance between the straight line L(i−1) and the i-th cooling capacity Pi (Pi.x, Pi.y). That is, this distance is calculated as the error hi, which is an index of linearity determination in the i-th limit cycle. FIG. 9 shows a calculation example of error h2 for the second limit cycle.

F. Processing Procedure

Figure 10:
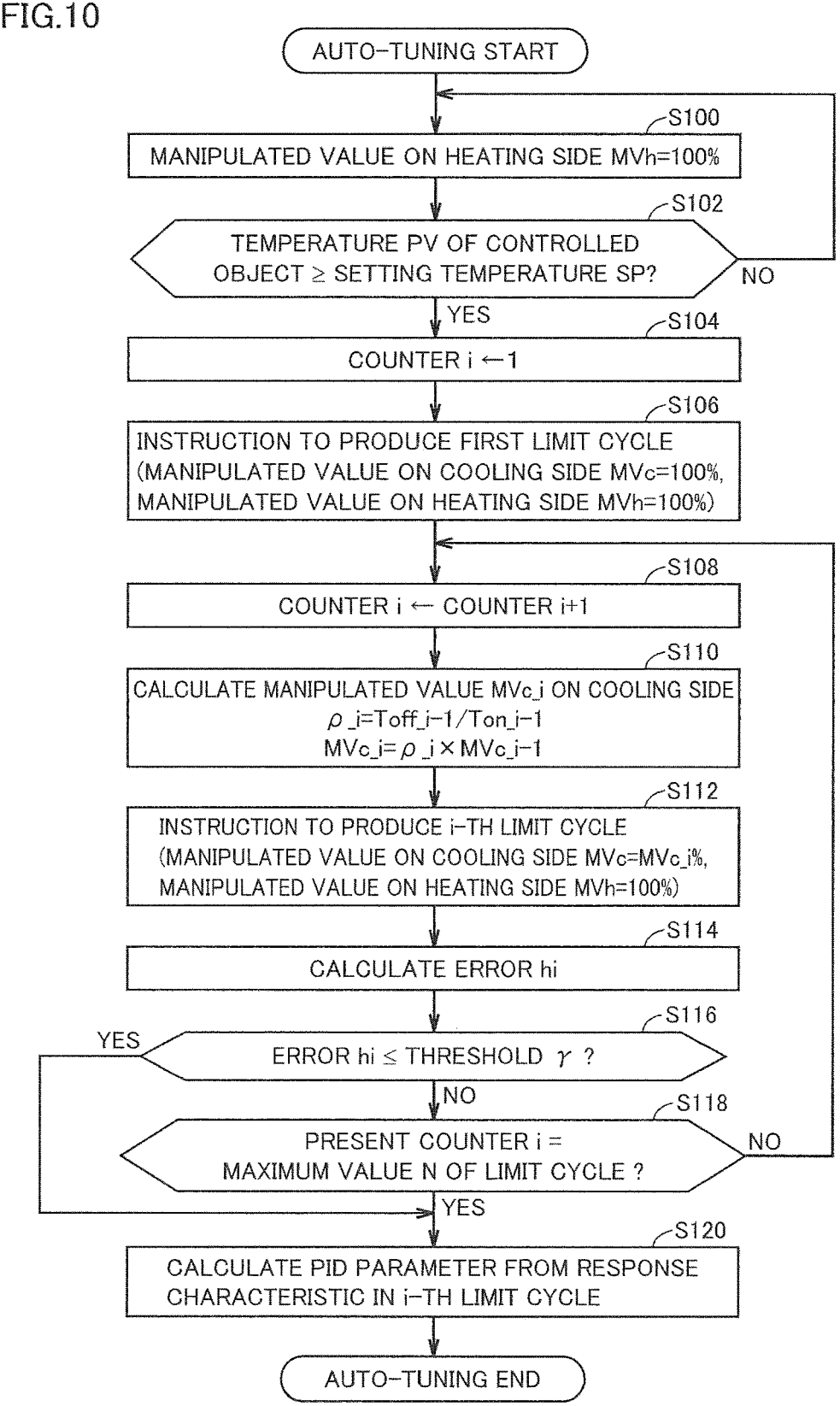
FIG. 10 is a flowchart showing the processing procedure of auto-tuning executed in the controller according to one or more embodiments of the present invention.

The processing procedure of auto-tuning executed in controller 100 according to one or more embodiments of the present invention will now be described. FIG. 10 is a flowchart showing the processing procedure of auto-tuning executed in controller 100 according to one or more embodiments of the present invention. Each step shown in FIG. 10 is typically implemented by CPU 112 of controller 100 executing instruction codes included in program module 118 stored in flash ROM 114. The processing procedure shown in FIG. 10 is repeatedly executed in a predetermined computation cycle (for example, every 100 msec) when, for example, the user gives an instruction to start auto-tuning.

Referring to FIG. 10, CPU 112 outputs 100% as the manipulated value on the heating side (step S100) and determines whether the temperature measured from controlled process 200 (the temperature of the controlled object) PV reaches a target value (setting temperature) SP (step S102). If the temperature PV of the controlled object does not reach the setting temperature SP (NO in step S102), the processing after step S100 is repeated.

If the temperature PV of the controlled object reaches the setting temperature SP (YES in step S102), the processing after step S104 is executed. The processing in steps S100 and S102 is pre-processing for producing a limit cycle in connection with auto-tuning.

CPU 112 sets "1" in a counter i (step S104) and gives an instruction to produce the first limit cycle (step S106). This counter i indicates the count of limit cycles. The manipulated values on the cooling side and the heating side in the first limit cycle are both 100%. The instruction to produce a limit cycle includes a series of processing of outputting the manipulated value on the cooling side (in this case, 100%) until the temperature PV of the controlled object follows the setting temperature SP and outputting the manipulated value on the heating side (in this case, 100%) when the temperature PV of the controlled object follows the setting temperature SP.

Upon completion of production of a single limit cycle, CPU 112 increments the counter i by one (step S108). CPU 112 then calculates the change coefficient $\rho\_i$ (=Toff_i−1/Ton_i−1) using the cooling output time Toff_i−1 and the heating output time Ton_i−1 for the manipulated value on the cooling side in the previous limit cycle and calculates the present manipulated value MVc_i on the cooling side (=MVc_i−1×$\rho\_i$) using the calculated change coefficient $\rho\_i$ (step S110).

CPU 112 then gives an instruction to produce the i-th limit cycle (step S112). Let the manipulated value on the cooling side in the i-th limit cycle be MVc_i % and the manipulated value on the heating side be 100%. The instruction to produce a limit cycle includes a series of processing of outputting the manipulated value on the cooling side (in this case, MVc_i %) until the temperature PV of the controlled object follows the setting temperature SP and outputting the manipulated value on the heating side (in this case, 100%) when the temperature PV of the controlled object follows the setting temperature SP. CPU 112 then calculates the error hi from the present cooling characteristic (response characteristic) and the previous cooling characteristic (response characteristic) (step S114).

CPU 112 thereafter determines whether the calculated error hi is equal to or smaller than a threshold γ (step S116). If the calculated error hi exceeds the threshold γ (NO in step S116), CPU 112 determines whether the present value i of the counter i reaches the maximum value N of the limit cycle (step S118).

If the present value of the counter i does not reach the maximum value N of the limit cycle (NO in step S118), CPU 112 executes the processing after step S108.

By contrast, if the calculated error hi is equal to or smaller than the threshold γ (YES in step S116), or if the present value of the counter i reaches the maximum value N of the limit cycle (YES in step S118), CPU 112 calculates a PID parameter from the response characteristic in the i-th limit cycle (step S120). The processing then ends.

G. Control Configuration

Figure 11:
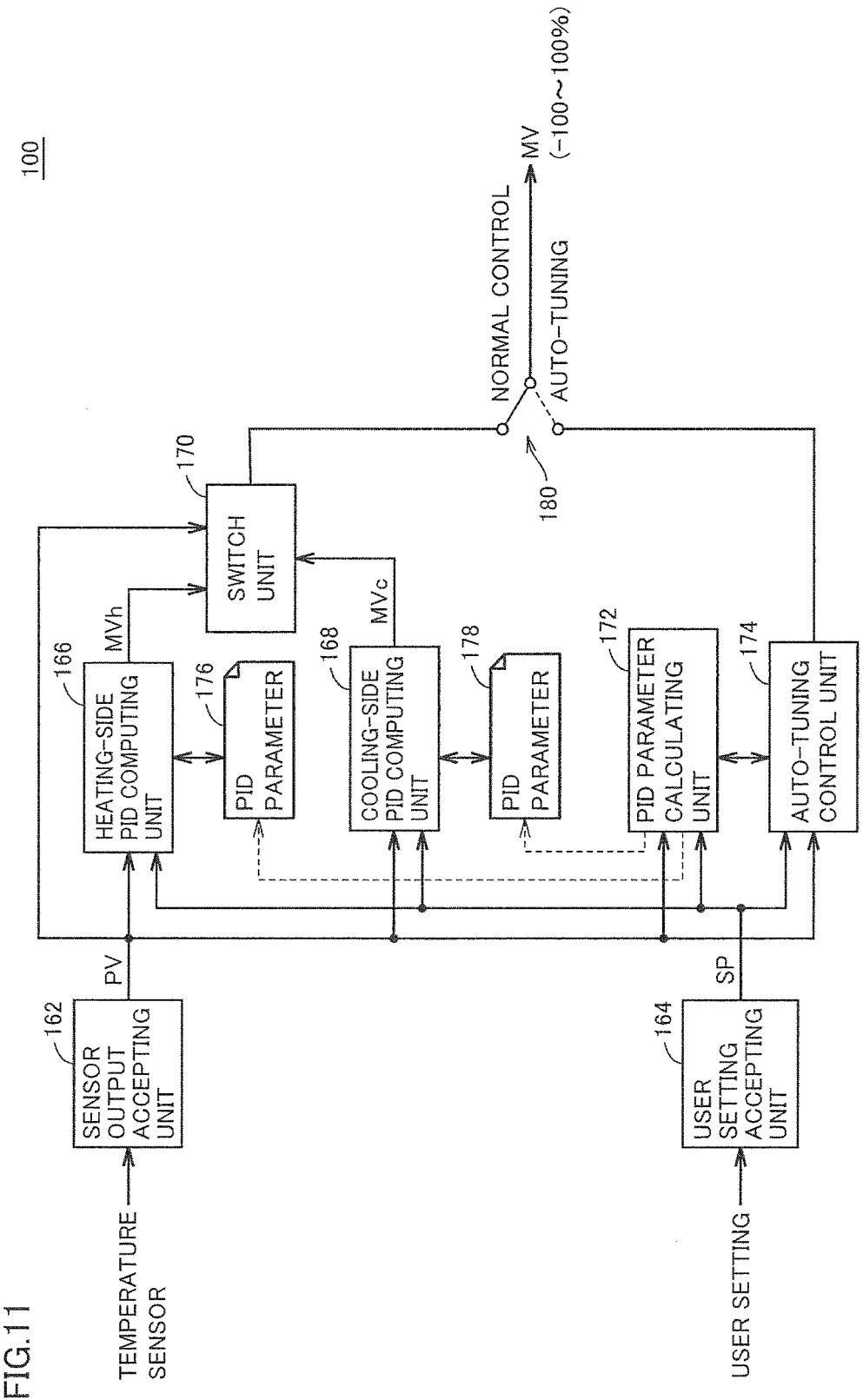
FIG. 11 is a schematic diagram showing a control configuration for implementing the auto-tuning function provided on the controller according to one or more embodiments of the present invention.

A control configuration for implementing the auto-tuning function provided on controller 100 according to one or more embodiments of the present invention will now be described. FIG. 11 is a schematic diagram showing a control configuration for implementing the auto-tuning function on controller 100 according to one or more embodiments of the present invention.

Referring to FIG. 11, controller 100 includes, as its control configuration, a sensor output accepting unit 162, a user setting accepting unit 164, a heating-side PID computing unit 166, a cooling-side PID computing unit 168, a switch unit 170, a PID parameter calculating unit 172, an auto-tuning control unit 174, and a switch 180.

Sensor output accepting unit 162 accepts an output signal from temperature sensor 240 and outputs the temperature PV of the controlled object after performing a predetermined range adjustment and the like. User setting accepting unit 164 accepts the setting of the setting temperature SP in accordance with the user operation. The setting temperature SP may be set from an external device (for example, a PLC (Programmable Logic Control).

Heating-side PID computing unit 166 and cooling-side PID computing unit 168 are sections for executing normal PID control, and calculate and output the manipulated values MVh and MVc, respectively, from the temperature PV of the controlled object and the setting temperature SP, in accordance with PID parameters 176 and 178, respectively. PID parameters 176 and 178 are automatically set by PID parameter calculating unit 172 described later in one or more embodiments of the present invention although they may be directly input by the user.

Switch unit 170 outputs the manipulated values MVh and MVc output from the heating-side PID computing unit 166 and the cooling PID computing unit 168, respectively, in a switching manner depending on the situation. In feedback control system 1 shown in FIG. 1, since both of the heating-side PID computing unit 166 and the cooling-side PID computing unit 168 need not be active, the method of directly switching between the manipulated values may be replaced by such a configuration that only one of heating-side PID computing unit 166 and cooling-side PID computing unit 168 is selectively activated.

PID parameter calculating unit 172 and auto-tuning control unit 174 are sections for executing auto-tuning. Auto-tuning control unit 174 produces the manipulated value (the manipulated values MVh and MVc) for producing a limit cycle as described above. PID parameter calculating unit 172 determines PID parameters 176 and 178 based on the heating characteristic and the cooling characteristic (response characteristics) observed in the final limit cycle.

Switch 180 switches the output source of the manipulated value between during normal control and during execution of auto-tuning. That is, during normal control, the manipulated value from switch unit 170 is output to controlled process 200, and during execution of auto-tuning, the manipulated value from auto-tuning control unit 174 is output to controlled process 200.

H. Auto-Tuning Result Examples

The result of evaluating the effects of the auto-tuning function according to one or more embodiments of the present invention by simulation will now be described.

Figure 12:
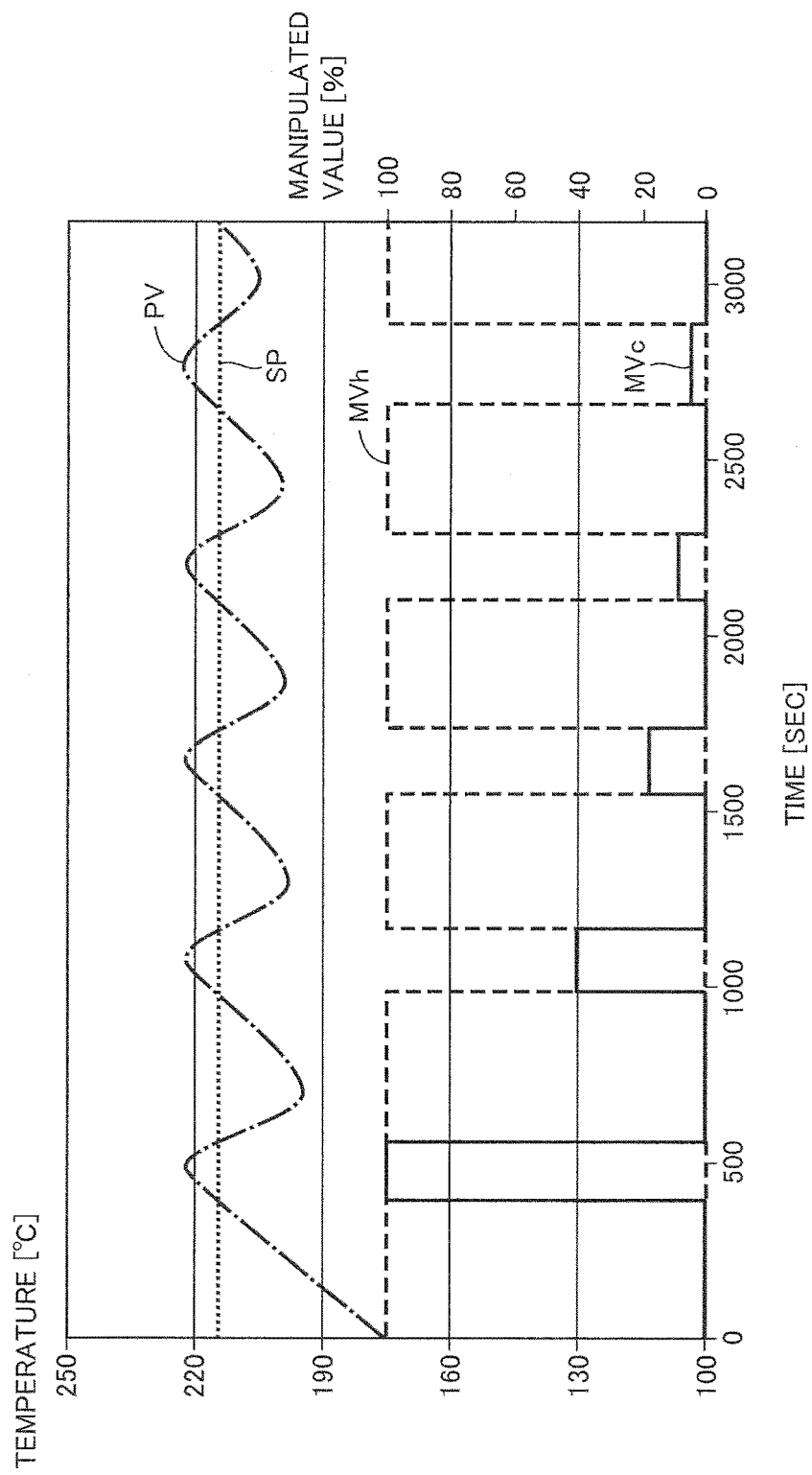
FIG. 12 shows an example of a temporal waveform in each unit in connection with auto-tuning according to one or more embodiments of the present invention.

FIG. 12 shows an example of a temporal waveform in each unit in connection with auto-tuning according to one or more embodiments of the present invention. In the simulation result shown in FIG. 12, the change coefficient $\rho\_i$ for the manipulated value MVc on the cooling side is calculated in each cycle in accordance with the change coefficient $\rho\_i$=the cooling output time Toff_i−1/the heating output time Ton_i−1. It is noted that the change coefficient upper limit value $\rho\_max$ is set to 0.4 because the nonlinear point (where the characteristic abruptly changes) is generally in a region where the manipulated value is 5 to 20% in the controlled process 200 (that is, the extruder with the water-cooling method or the air cooling method) included in feedback control system 1 shown in FIG. 1.

In the simulation result shown in FIG. 12, the error hi is equal to or smaller than the threshold γ in the fifth limit cycle. The PID parameter is therefore determined based on the cooling characteristic and the heating characteristic (response characteristics) observed in the fifth limit cycle.

As shown in FIG. 12, it can be understood that the manipulated value MVh on the heating side is kept at 100% whereas the manipulated value MVc on the cooling side gradually decreases. The PID parameter is determined using, for example, the ultimate sensitivity method, based on the limit cycle produced in the temperature PV of the controlled object.

Figure 13:
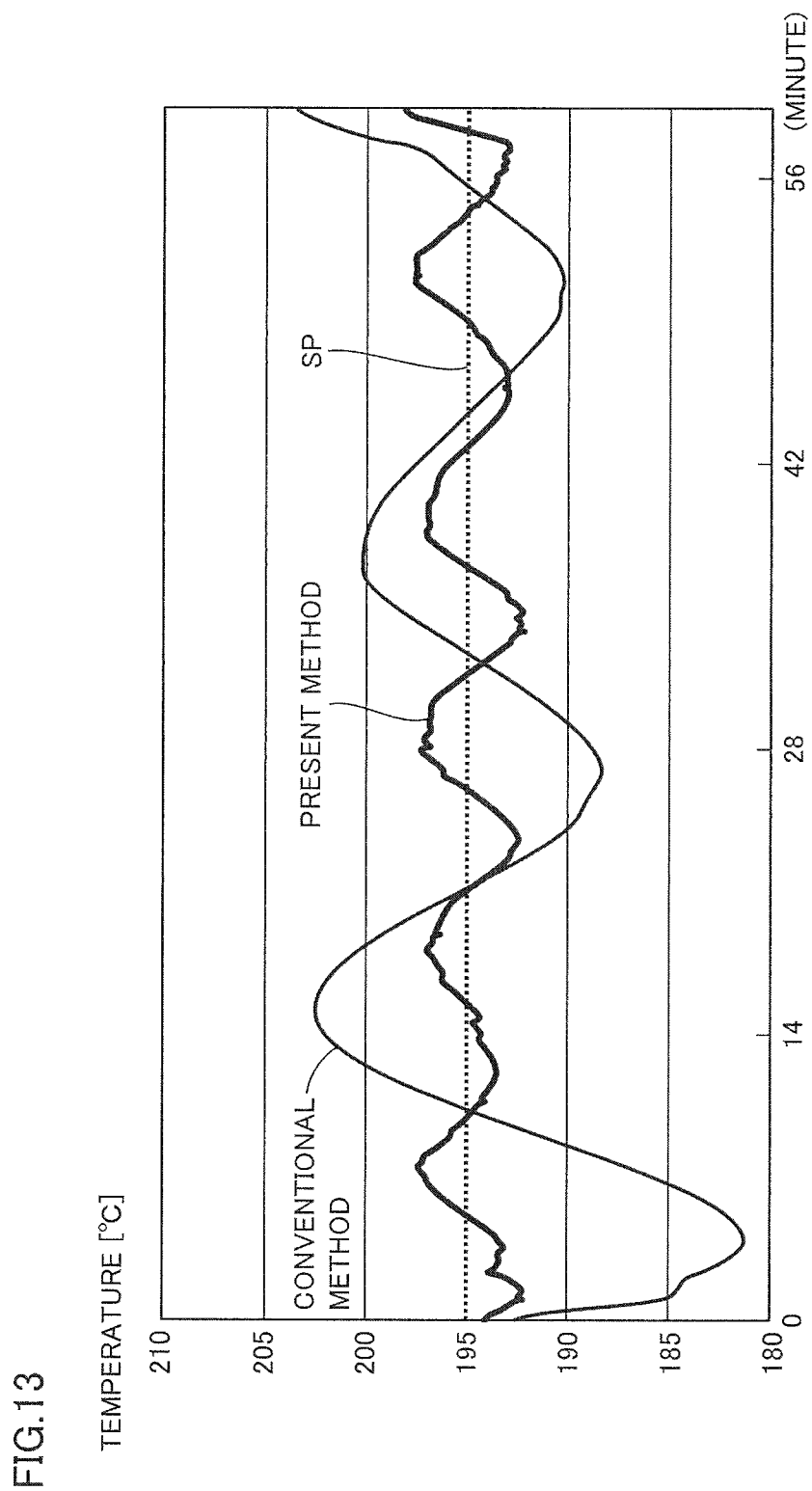
FIG. 13 is a diagram showing a comparative example of control performance using a PID parameter calculated by execution of auto-tuning shown in FIG. 12.

FIG. 13 is a diagram showing a comparative example of control performance using a PID parameter calculated by execution of auto-tuning shown in FIG. 12. FIG. 12 shows the result of feedback control performed using the PID parameter determined using conventional auto-tuning and the result of feedback control performed using the PID parameter determined using the auto-tuning according to one or more embodiments of the present invention.

As can be understood from FIG. 13, it can be said that the temperature PV of the controlled object can be brought into agreement with the setting temperature SP with higher precision by using the PID parameter determined by the auto-tuning according to one or more embodiments of the present invention.

When the maximum value N of the limit cycle is set to "3", auto-tuning is completed at the point of time when the third change is made in the manipulated value MVc on the cooling side changed step-by-step as shown in FIG. 12. Even in this case, a generally appropriate PID parameter can be determined because the manipulated value MVc_3 on the cooling side in the third limit cycle and the manipulated value MVc_5 on the cooling side in the fifth limit cycle are relatively close values. That is, although a kind of trade-off relation holds between the time required for auto-tuning and the precision of the PID parameter, a PID parameter that avoids the effects of nonlinearity can be determined by executing auto-tuning using the manipulated value in a range used in normal PID control.

I. User Interface

In auto-tuning, a given manipulated value is actually provided to the controlled object to calculate a PID parameter based on the response characteristic. In the limit cycle method, in particular, since a characteristic value for a control system is estimated by making the process value (PV) to oscillate, a relatively long time is required for observing a necessary response characteristic in the control system with a long time constant. It is therefore more user-friendly to notify the user of an execution state, a complete time (predicted value), and the like during execution of auto-tuning.

An example of a user interface for user assistance in connection with such auto-tuning will be described below.

(i1: Notice of Execution State of Auto-Tuning)

Figure 14:
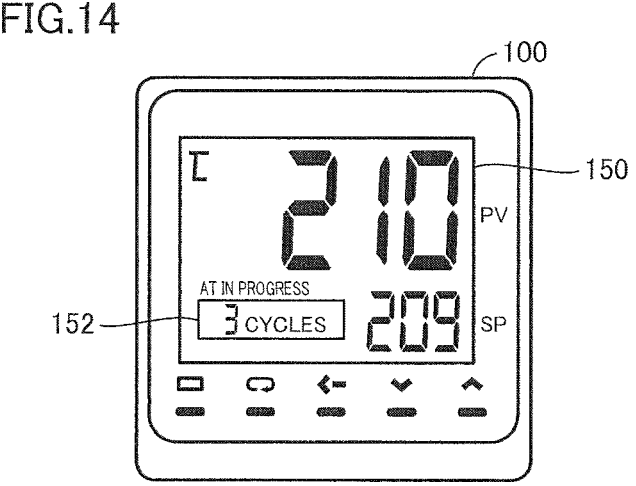
FIG. 14 is a diagram showing an example of a user interface provided by the controller according to one or more embodiments of the present invention.

A user interface that gives a notice of an execution state of auto-tuning is first described. FIG. 14 is a diagram showing an example of a user interface provided by controller 100 according to one or more embodiments of the present invention. Controller 100 shown in FIG. 14 has a display unit 150. Display unit 150 displays the temperature PV of the controlled object and the present value of the setting temperature SP. The user operates the button or switch arranged near the display unit 150 to change the setting temperature SP and the like.

FIG. 14 shows a state during execution of auto-tuning. As shown in FIG. 14, the count of the limit cycle produced at present, that is, how many times the limit cycles have been executed is displayed as the value of the execution state of auto-tuning. Display unit 150 includes an indicator 152 showing the count of the present limit cycle. That is, controller 100 includes display unit 150 as display means for displaying the count of the alternate output executed at present.

Since the maximum number N of the limit cycle is preset, the user views the count of the present limit cycle in this manner to know how long it will take for auto-tuning to be completed.

(i2: Notice of Completion Timing of Auto-Tuning)

In place of or in addition to the count of the present limit cycle as shown in FIG. 14, a notice of the time required for completion of auto-tuning may be given. That is, controller 100 may include display unit 150 as display means for displaying the timing when the alternate output required for determining a PID parameter is completed.

Figure 15:
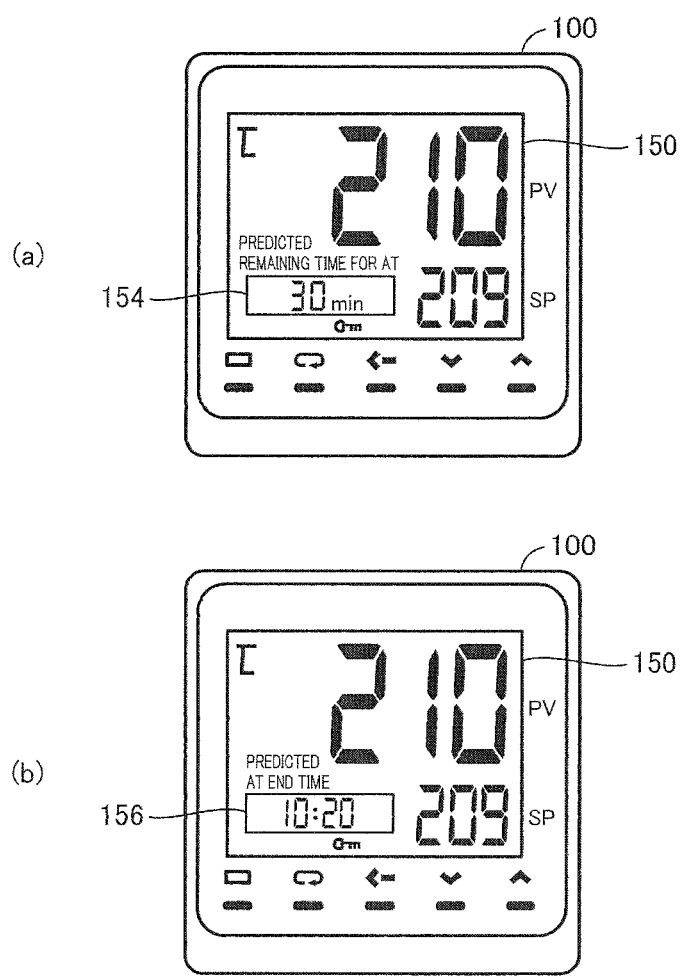
FIGS. 15(a)-15(b) are diagrams showing another example of the user interface provided by the controller according to one or more embodiments of the present invention.

FIGS. 15(a)-15(b) are diagrams showing another example of the user interface provided by controller 100 according to one or more embodiments of the present invention.

FIG. 15(a) shows an example of display unit 150 including an indicator 154 showing the remaining time required until completion of auto-tuning. As a method for predicting the remaining time required until completion of auto-tuning, first, a single limit cycle is produced and the time required therefor is measured, and the remaining time can be calculated by multiplying the measured time by the maximum value N of the limit cycle. Alternatively, the remaining time may be calculated from the time required for producing a half cycle of the limit cycle (on the cooling side or the heating side). If auto-tuning has been executed previously, the remaining time may be calculated based on the response characteristic obtained at that time.

The time when auto-tuning is completed may be displayed, rather than the remaining time required until completion of auto-tuning. Display unit 150 shown in FIG. 15(b) includes an indicator 156 showing the predicted time when auto-tuning is completed.

As described above, the user can know the timing of completion in advance for auto-tuning, which takes a relatively long time, and therefore can make effective use of time.

J. First Modification

In one or more of the foregoing embodiments, a configuration example in which the manipulated value MVc on the cooling side is successively changed by multiplying the change coefficient $\rho\_i$ representing the system gain ratio (capacity ratio) between heating and cooling has been described. This change coefficient $\rho\_i$ is not limited thereto and may be set to any given value. In place of the configuration in which the change coefficient $\rho\_i$ is dynamically determined in each limit cycle, a fixed value may be employed as the change coefficient $\rho$ in a series of auto-tuning.

As described above, the change coefficient $\rho\_i$ (or change coefficient $\rho$ (fixed value)) may be set as appropriate in accordance with, for example, a controlled object. There is a need for minimizing the time required for auto-tuning. A configuration for completing auto-tuning in a shorter time without losing the technical concept of the system gain ratio (capacity ratio) between heating and cooling as described above will be described as a modification in connection with the change coefficient.

In the present modification, when each limit cycle is finished, the value obtained by multiplying the present manipulated value by the square of the change coefficient $\rho\_i$ is used as a new manipulated value for use in the next limit cycle. That is, the manipulated value $MVc\_i$ is successively changed according to the equation below.

Change coefficient $\rho\_i$=cooling output time $Toff\_i-1$/heating output time $Ton\_i-1$ Manipulated value $MVc\_i=MVc\_1-1\times\rho\_i\times\rho\_i$ Using the square of the change coefficient $\rho\_i$ in this manner, the manipulated value MVc is changed by substantially skipping one step in the processing of changing the manipulated value MVc on the cooling side step-by-step as shown in FIG. 12. That is, as the auto-tuning function, controller 100 determines the magnitude of the first manipulated value in a new alternate output by correcting the magnitude of the first manipulated value in the immediately preceding alternate output in accordance with the square of the ratio ($\rho$) of the length of the period (cooling output time Toff) in which the first manipulated value (output on the heating side) is output to the length of the period (heating output time Ton) in which the second manipulated value (output on the heating side) is output in the immediately preceding alternate output.

Figure 16:
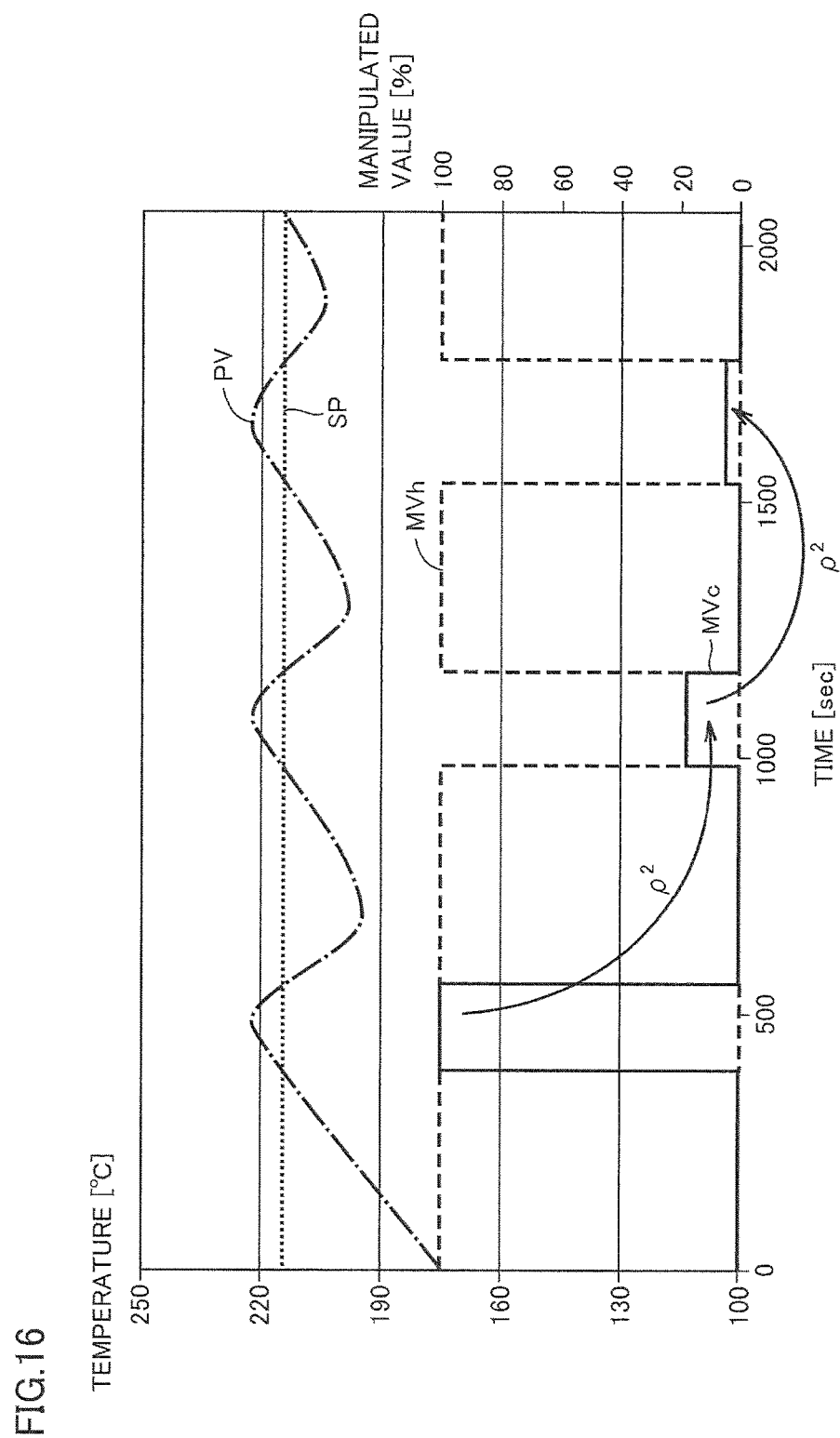
FIG. 16 shows an example of a temporal waveform in each unit in connection with auto-tuning according to a first modification of one or more embodiments of the present invention.

FIG. 16 shows an example of a temporal waveform in each unit in connection with auto-tuning according to the first modification. When the manipulated value MVc is successively changed by multiplying the change coefficient $\rho\_i$ (FIG. 12), the error hi does not become equal to or smaller than the threshold γ unless the fifth limit cycle is produced, whereas, as shown in FIG. 16, the manipulated value MVc is successively changed by multiplying the square of the change coefficient $\rho\_i$ to produce the limit cycle three times, whereby the error hi becomes equal to or smaller than the threshold γ. As described above, when it is previously known that the controlled object has nonlinearity, the degree of changing the manipulated value MVc is increased thereby reducing the time for auto-tuning.

K. Second Modification

In the foregoing first modification, the manipulated value MVc is successively changed by multiplying the square of the change coefficient $\rho\_i$ representing the system gain ratio (capacity ratio) between heating and cooling. However, the manipulated value MVc may be successively changed by multiplying the n-th power (n>1) of the change coefficient $\rho\_i$, rather than the square of the change coefficient $\rho\_i$. The reason why the manipulated value MVc may be successively changed by multiplying the n-th power (n>1) of the change coefficient $\rho\_i$ in this manner will be described below.

In extruder 232 as described above, the cooling capacity is larger than the heating capacity and has nonlinearity. In the auto-tuning function using the limit cycle method, the precision can be increased as the limit cycle to be produced is brought closer to a sinusoidal wave.

Figure 17:
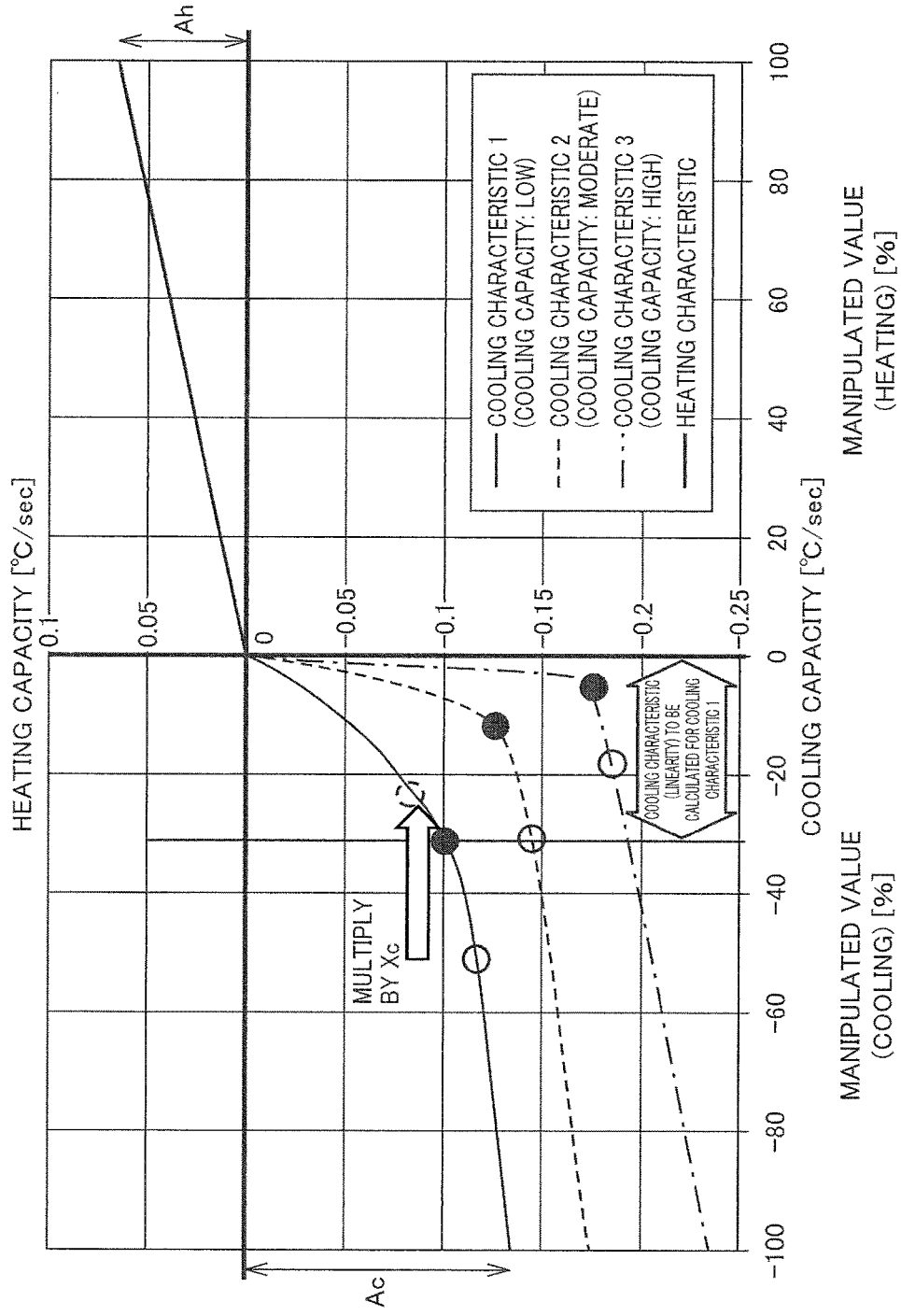
FIG. 17 is a diagram showing an example of the relation between the heating capacity and cooling capacity and the manipulated values (heating and cooling) in the controlled process shown in FIG. 2.

FIG. 17 is a diagram showing an example of the relation between the heating capacity and cooling capacity and the manipulated values (heating and cooling) in the controlled process shown in FIG. 2. In the characteristic example shown in FIG. 17, the first quadrant shows the relation between the heating capacity (vertical axis) and the manipulated value (heating) (horizontal axis). Ah shows the magnitude of the heating capacity [° C./sec] when the manipulated value (heating) is 100%. The third quadrant shows the relation between the cooling capacity (vertical axis) and the manipulated value (cooling) (horizontal axis). Ac shows the magnitude of the cooling capacity [° C./sec] when the manipulated value (cooling) is 100%. The cooling capacity changes with the facility installation conditions and the setting conditions, and FIG. 17 shows the respective characteristics of the cooling capacity with three different setting conditions.

Here, in FIG. 17, the point where the characteristic of the cooling capacity (the point shown by the black circle in FIG. 17) is defined as a nonlinear point.

When the manipulated value MVc_2 on the cooling side in the second limit cycle is calculated using the change coefficient $\rho\_2$ (=cooling output time Toff_1/heating output time Ton_1) representing the system gain ratio (capacity ratio) between heating and cooling as described in one or more embodiments of the present invention, the calculation is done according to the equation below.

$$MVc\_2 = 100\% \times \text{change coefficient } \rho\_2$$

In FIG. 17, the white circle shows the manipulated value MVc_2 on the cooling side in the second limit cycle calculated according to the equation above. That is, the equation above is equivalent to a calculation formula for balancing the capacity of heating and the capacity of cooling when the characteristic of the cooling capacity is linear.

Here, as shown in FIG. 17, for example, the range of cooling characteristic (linear characteristic) to be calculated for the cooling characteristic 1 is a region in which the manipulated value is smaller than the point indicated by the white circle. Therefore, the characteristic in the range (the linear section) shown by the arrow in FIG. 17 cannot be grasped only by multiplying the ratio (capacity ratio) between heating and cooling, because the manipulated value MVc_2 on the cooling side in the second limit cycle is greater than the nonlinear point (the position indicated by the black circle). As for the other cooling characteristics shown in FIG. 17, the linear section cannot be grasped only by multiplying the system gain ratio (capacity ratio) between heating and cooling, because the respective nonlinear points (the positions indicated by the black circles) change.

Then, for the controlled object having the cooling characteristics as shown in FIG. 17, a correction coefficient Xc (0<Xc<1) is introduced in the equation above in order to grasp the linearity in a range smaller than the nonlinear point. That is, when the manipulated value MVc_2 on the cooling side in the second limit cycle is calculated using the change coefficient $\rho\_2$ (=cooling output time Toff_1/heating output time Ton_1) representing the system gain ratio (capacity ratio) between heating and cooling, the calculation is done according to the equation below.

$$MVc\_2 = 100\% \times \text{change coefficient } \rho\_2 \times \text{correction coefficient } Xc$$

Using such an equation, in FIG. 17, the position indicated by the white circle (the manipulated value on the cooling side in the second limit cycle calculated by multiplying the change coefficient $\rho\_1$) is further multiplied by Xc and corrected to a point smaller than the nonlinear point (the position indicated by the black circle) (that is, toward zero) (the dotted circle).

As shown in the cooling capacities 1 to 3 in FIG. 17, the nonlinear point (the position indicated by the black circle) tends to come closer to the Y axis as the cooling capacity (Ac shown in FIG. 17) increases. That is, the X-coordinate value of the nonlinear point (the position indicated by the black circle) has a causal relation with the reciprocal of the cooling capacity (1/Ac).

Here, the coordinate value of the horizontal axis of the nonlinear point (the position indicated by the black circle) has a causal relation with the capacity ratio (the change coefficient $\rho$) because the relation of the reciprocal of the cooling capacity (1/Ac) $\propto$ the system gain ratio between heating and cooling (capacity ratio: Ah/Ac) $\propto$ the capacity ratio (change coefficient $\rho$) holds.

The characteristics shown in FIG. 17 are obtained in extruder 232 including heating device 210 and cooling device 220. It is noted that the controlled value for heating generated in the controlled object by heating device 210 has relatively strong linearity with respect to the corresponding manipulated value, and the controlled value for cooling generated in the controlled object by cooling device 220 has relatively strong nonlinearity with respect to the corresponding manipulated value. When such extruder 232 is a controlled object, the causal relation between the correction coefficient Xc and the capacity ratio (change coefficient $\rho$) is modeled as $Xc = \rho^m$ ($0.5 \le m \le 2.0$), so that the manipulated value on the cooling side (the dotted circle) to be calculated in the second limit cycle is closer to the vertical axis than the nonlinearity point (the position indicated by the black circle), and the characteristic of the linear section can be grasped. This relation presumably holds in extruder 232 even when the magnitude of the cooling capacity varies.

Therefore the equation above including the correction coefficient Xc can be transformed as follows.

$$\begin{aligned} MVc\_2 &= 100\% \times \text{change coefficient } \rho\_2 \times \text{change coefficient } \rho\_2^m \\ &= 100\% \times \text{change coefficient } \rho\_2^{(m+1)} \\ &= 100\% \times \text{change coefficient } \rho\_2^n \end{aligned}$$

As described above, the manipulated value MVc_i is successively changed using the value obtained by multiplying the present manipulated value by the n-th power of the change coefficient $\rho\_i$. As for the n-th power, according to one or more embodiments of the present invention, n is a value in the vicinity of two. More specifically, controller 100 determines the magnitude of the first manipulated value (the manipulated value on the cooling side) in a new alternate output using n that satisfies $1.5 \le n \le 3.0$.

As described above, when it is previously known that the controlled object has nonlinearity, the time for auto-tuning can be reduced by calculating the manipulated value MVc in a new limit cycle by multiplying the n-th power of the change coefficient for the manipulated value MVc.

L. Third Modification

In one or more of the foregoing embodiments, the limit cycle is produced multiple times. However, for a controlled object of a certain type, an appropriate parameter can be determined only from the response characteristic obtained with a single limit cycle. In the method described below, a single limit cycle is produced, that is, the first manipulated value (the manipulated value on the cooling side) and the second manipulated value (the manipulated value on the heating side) are alternately output in accordance with the process value, and a parameter is determined only from the response characteristic obtained therewith.

Figure 18:
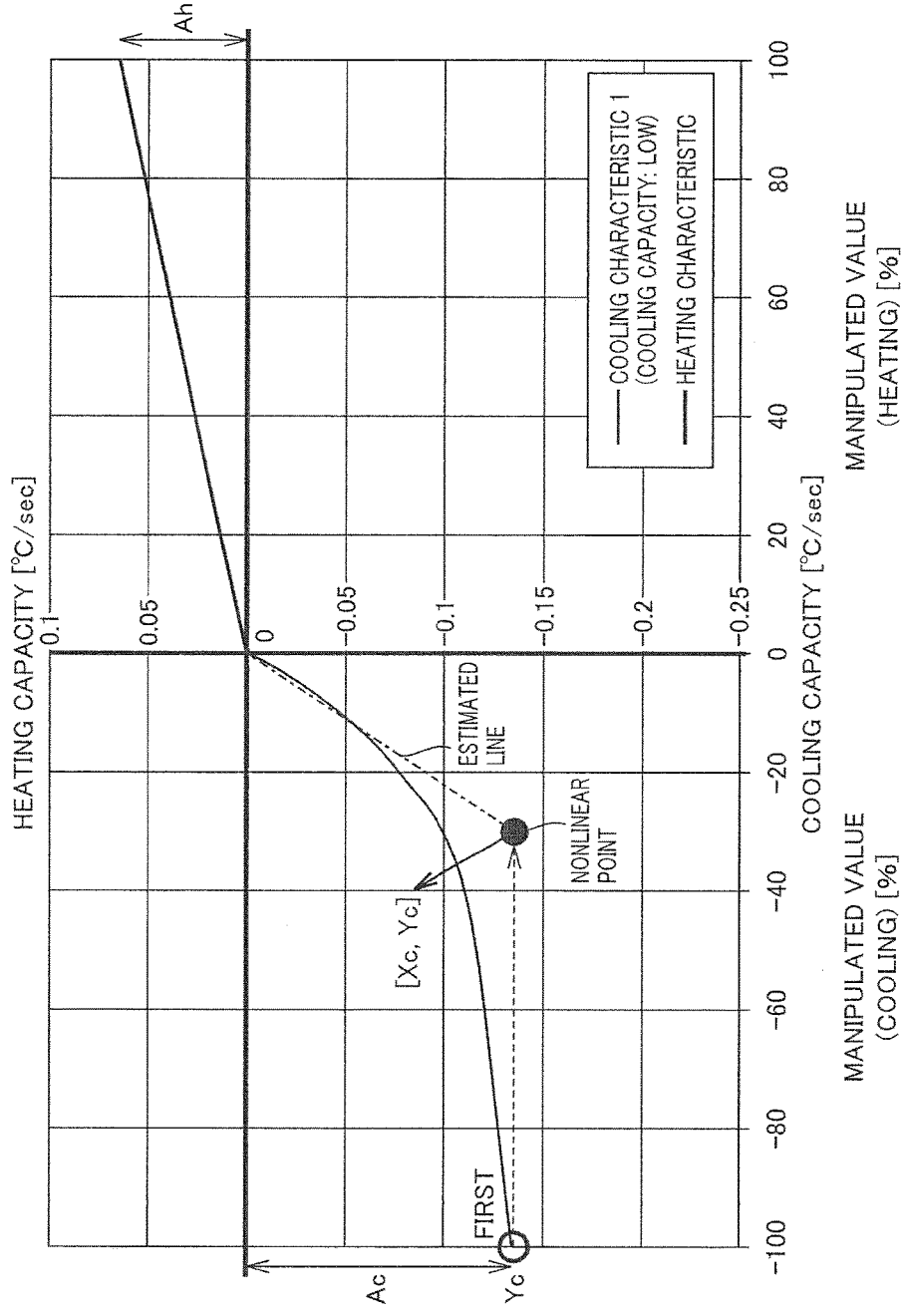
FIG. 18 is a diagram illustrating the process for determining a parameter according to a third modification of one or more embodiments of the present invention.

FIG. 18 is a diagram illustrating the process for determining a parameter according to the third modification. Referring to FIG. 18, letting the manipulated value MVc on the cooling side be 100%, a (first) limit cycle is produced. Here, the manipulated value MVh on the heating side is also set to 100%. The cooling capacity Yc [° C./sec] is calculated from the response characteristic (temporal waveform) obtained by producing the limit cycle. Assuming that the cooling capacity Yc does not change even when the manipulated value MVc on the cooling side is changed, the characteristic obtained if the second limit cycle is produced is estimated.

More specifically, the manipulated value Xc on the cooling side corresponding to the nonlinear point (the point indicated by the black circle in FIG. 18) is calculated by the method according to the foregoing second modification. That is, the change coefficient ρ is determined from the ratio of the cooling output time Toff to the heating output time Ton, based on the response characteristic produced in the first limit cycle, and the value obtained by multiplying the determined change coefficient ρ by the n-th power (where $1.5 \leq n \leq 3.0$) is determined as the manipulated value Xc on the cooling side corresponding to the nonlinear point. The value obtained by multiplying a correction coefficient statically or dynamically determined may be employed. Assuming that the same cooling capacity Yc [° C./sec] as the cooling capacity determined from the first limit cycle is kept at the nonlinear point, the characteristic value of the nonlinear point is estimated using the manipulated value Xc [%] determined through the procedure as described above. That is, the coordinates of the nonlinear point in the coordinate system shown in FIG. 18 are [Xc, Yc]. The slope Ac [° C./sec] for the straight line (estimated line) connecting the nonlinear point [Xc, Yc] and the origin [0, 0] is determined as the cooling capacity in the range of the manipulated value Xc in which linearity is kept. A PID parameter is then determined using this cooling capacity Ac [° C./sec].

As described above, in the present modification, (1) the cooling capacity Yc [° C./sec] is calculated from the first limit cycle response characteristic (temporal waveform), (2) the cooling manipulated value Xc [%] at the nonlinear point is estimated, (3) the nonlinear point [Xc, Yc] is determined assuming that the cooling capacity is kept equivalent to when the manipulated value on the cooling side is 100%, (4) the slope Ac of the estimated line passing through the nonlinear point [Xc, Yc] and the origin is calculated as the cooling capacity, and (5) the PID parameter is calculated using the cooling capacity Ac.

In the present modification, as the auto-tuning function, controller 100 alternately outputs the first manipulated value (the manipulated value on the cooling side) and the second manipulated value (the manipulated value on the heating side) once for each in accordance with the process value and determines the PID parameter from the response characteristic (temporal waveform) obtained through the alternate output of the first manipulated value (the manipulated value on the cooling side) and the second manipulated value (the manipulated value on the heating side) once for each. In this auto-tuning function, controller 100 estimates the range (that is, nonlinear point) of the first manipulated value (the manipulated value on the cooling side) in which the first change in the controlled value for the first manipulated value (the manipulated value on the cooling side) keeps linearity, from the response characteristic, and determines the PID parameter from the estimated range.

In order to verify the validity of the auto-tuning function according to the present modification, the result of comparison with the auto-tuning function according to one or more embodiments of the present invention as described above is shown. More specifically, the degrees of difference (error ratio) between the PID parameters (proportional gains (proportional band)) calculated in the auto-tuning function according to one or more embodiments of the present invention (actually measuring the characteristic of the nonlinear point) and in the auto-tuning function according to the present modification (estimating the characteristic of the nonlinear point) are compared.

Figure 19:
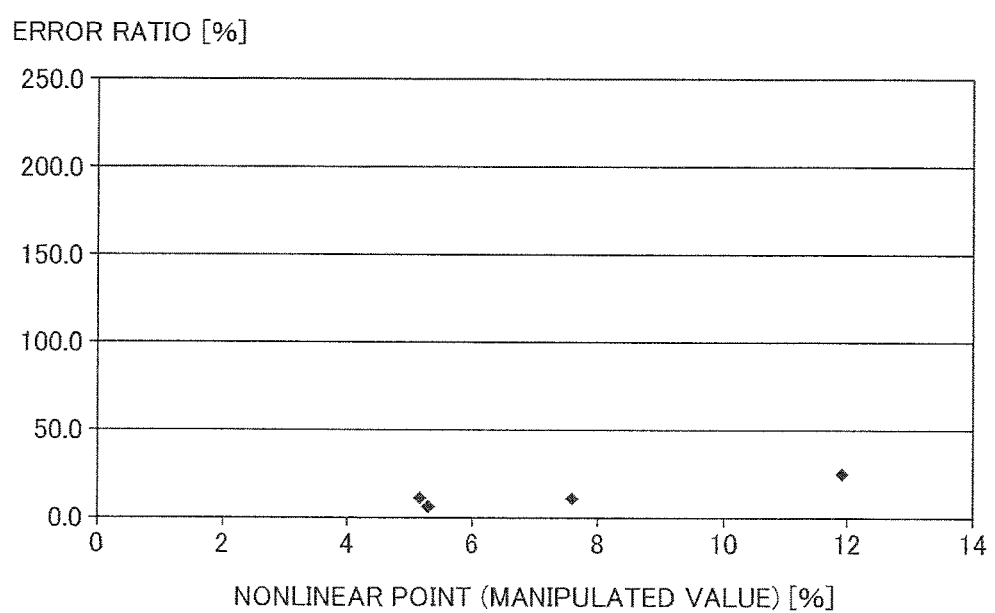
FIG. 19 is a diagram showing an example of the evaluation result of the error ratio of the PID parameter calculated by the auto-tuning function according to the present modification.

FIG. 19 is a diagram showing an example of the evaluation result of the error ratio of the PID parameter calculated by the auto-tuning function according to the present modification. In the evaluation result example shown in FIG. 19, the error ratio e calculated for each of the estimated nonlinear points (the manipulated value on the cooling side) is plotted. This error ratio e is calculated using a proportional band Pb0 calculated using the auto-tuning function according to one or more embodiments of the present invention and a proportional band Pb calculated using the auto-tuning function according to the present modification, according to the equation shown below.

$$\text{Error } e = (Pb - Pb0)/Pb0 \times 100 \, [\%]$$

FIG. 19 shows the evaluation result in the application to a casting heater cooling method as shown in cooling device 220 shown in FIG. 2. According to the evaluation result shown in FIG. 19, when compared with the auto-tuning function (actually measuring the characteristic of the nonlinear point) according to one or more embodiments of the present invention, the error ratio is about 10% on average and falls within 25% at maximum. It is thus understood that sufficiently practical precision is obtained.

As described above, in the present modification, the nonlinear point is estimated from the response characteristic (temporal waveform) obtained with the first limit cycle without producing the second limit cycle, and the PID parameter is then determined. The method in which a limit cycle is produced only once and the PID parameter is determined from the result can be employed to increase the time efficiency of tuning operation, because although the estimation precision may be slightly lower than when the limit cycle is produced multiple times, the reduction in precision is of an insignificant degree in practice, and still the time required for auto-tuning can be reduced.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 feedback control system, 100 controller, 110 control unit, 112 CPU, 114 ROM, 116 RAM, 118 program module, 120 input unit, 130 output unit, 132 heating-side output unit, 134 cooling-side output unit, 140 setting unit, 150 display unit, 152, 154, 156 indicator, 162 sensor output accepting unit, 164 user setting accepting unit, 166 heating-side PID computing unit, 168 cooling-side PID computing unit, 170 switch unit, 172 PID parameter calculating unit, 174 auto-tuning control unit, 176 PID parameter, 180 switch, 200 controlled process, 210 heating device, 212 solid state relay, 214 electric heater, 220 cooling device, 222 cooling tube, 224 solenoid valve, 226 water temperature regulating facility, 230 controlled object, 232 extruder, 234 screw, 236 barrel, 240 temperature sensor.

The invention claimed is:

1. A controller having an auto-tuning function, comprising:
   a manipulated value determination unit that selectively determines a first manipulated value for causing a first change in a controlled value of a controlled object or a second manipulated value for causing a second change opposite to the first change in the controlled value, in accordance with a preset parameter, so that a process value obtained from the controlled object follows a target value; and
   a tuning unit that alternately outputs the first manipulated value and the second manipulated value in accordance with the process value, and that modifies the preset parameter from a response characteristic obtained through the alternate output,
   wherein the tuning unit successively changes a magnitude of the first manipulated value each time output is switched during the alternate output of the first manipulated value and the second manipulated value, and
   wherein the tuning unit modifies the preset parameter from a response characteristic obtained when determined that the first change in the controlled value to the first manipulated value has linearity.

2. The controller according to claim 1, wherein the tuning unit determines a magnitude of the first manipulated value in a new alternate output from a response characteristic obtained through an immediately preceding alternate output.

3. The controller according to claim 2, wherein the tuning unit determines a magnitude of the first manipulated value in the new alternate output by correcting a magnitude of the first manipulated value in an immediately preceding alternate output in accordance with a length of a period in which the first manipulated value is output and a length of a period in which the second manipulated value is output in the immediately preceding alternate output.

4. The controller according to claim 1, wherein the tuning unit determines whether the first change in the controlled value to the first manipulated value has linearity by evaluating a relation of a change rate of the controlled value corresponding to the first manipulated value, for each magnitude of the first manipulated value successively changed.

5. The controller according to claim 1, wherein the tuning unit modifies the preset parameter from a response characteristic obtained in a final alternate output if the alternate output of the first manipulated value and the second manipulated value is executed a predetermined number of times, even when it is not determined that the first change in the controlled value to the first manipulated value has linearity.

6. A control method in a controller having an auto-tuning function, comprising:
   selectively determining a first manipulated value for causing a first change in a controlled value of a controlled object or a second manipulated value for causing a second change opposite to the first change in the controlled value, in accordance with a preset parameter, so that a process value obtained from the controlled object follows a target value; and
   alternately outputting the first manipulated value and the second manipulated value in accordance with the process value and modifying the preset parameter from a response characteristic obtained through the alternate output,
   wherein the modifying the preset parameter includes successively changing a magnitude of the first manipulated value each time output is switched during the alternate output of the first manipulated value and the second manipulated value, and
   wherein the modifying the preset parameter includes modifying the preset parameter from a response characteristic obtained when it is determined that the first change in the controlled value to the first manipulated value has linearity.

7. A non-transitory storage medium comprising a control program for implementing a controller having an auto-tuning function, the control program causing a processor to perform:
   selectively determining a first manipulated value for causing a first change in a controlled value of a controlled object or a second manipulated value for causing a second change opposite to the first change in the controlled value, in accordance with a preset parameter, so that a process value obtained from the controlled object follows a target value; and
   alternately outputting the first manipulated value and the second manipulated value in accordance with the process value and modifying the preset parameter from a response characteristic obtained through the alternate output,
   wherein the modifying the preset parameter includes successively changing a magnitude of the first manipulated value each time output is switched during the alternate output of the first manipulated value and the second manipulated value, and
   wherein the modifying the preset parameter includes modifying the preset parameter from a response characteristic obtained when it is determined that the first change in the controlled value to the first manipulated value has linearity.

* * * * *